US011510226B2

(12) United States Patent
Luo et al.

(10) Patent No.: US 11,510,226 B2
(45) Date of Patent: Nov. 22, 2022

(54) DYNAMICALLY CONTROLLING A POWER STATE OF A MOBILE INTEGRATED ACCESS AND BACKHAUL NODE

(71) Applicant: QUALCOMM Incorporated, San Diego, CA (US)

(72) Inventors: Jianghong Luo, Skillman, NJ (US); Karl Georg Hampel, Hoboken, NJ (US); Navid Abedini, Somerset, NJ (US); Junyi Li, Chester, NJ (US); Luca Blessent, Whitehouse Station, NJ (US); Valentin Alexandru Gheorghiu, Yokohama (JP); Alessio Marcone, Nuremberg (DE); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/099,731

(22) Filed: Nov. 16, 2020

(65) Prior Publication Data
US 2021/0160898 A1    May 27, 2021

Related U.S. Application Data

(60) Provisional application No. 62/939,513, filed on Nov. 22, 2019.

(51) Int. Cl.
*H04W 72/12*    (2009.01)
*H04W 88/14*    (2009.01)
(Continued)

(52) U.S. Cl.
CPC ...... *H04W 72/1257* (2013.01); *H04B 17/336* (2015.01); *H04L 1/0003* (2013.01); *H04W 88/14* (2013.01); *H04W 92/20* (2013.01)

(58) Field of Classification Search
CPC .............. H04W 24/10; H04W 72/042; H04W 72/1257; H04W 88/14; H04L 1/0003; H04L 5/0048; H04L 5/0053
See application file for complete search history.

(56) References Cited

U.S. PATENT DOCUMENTS

| 8,811,905 B1* | 8/2014 | Hui ..................... H04W 52/243 455/63.1 |
| 9,992,751 B1* | 6/2018 | Manchanda ........ H04W 52/265 |
| 2012/0213083 A1* | 8/2012 | Shafer ................. H04L 12/2801 370/241 |

FOREIGN PATENT DOCUMENTS

WO    WO-2013192356 A1    12/2013

OTHER PUBLICATIONS

International Search Report and Written Opinion—PCT/US2020/060851—ISA/EPO—dated Feb. 19, 2021.

* cited by examiner

*Primary Examiner* — Jamal Javaid
(74) *Attorney, Agent, or Firm* — Danai Nelisile Mhembere; Holland & Hart LLP

(57) ABSTRACT

Methods, systems, and devices for wireless communications are described to enable a mobile access node to enter a new power state based on detection of a second access node. The second access node may be detected by the mobile access node or a central unit (CU). The mobile access node or the CU may determine for the mobile access node to enter a new power state and may notify the other of the determination. The mobile access node may enter a lower power state if the second access node is within a defined proximity or if one or more thresholds are exceeded. The mobile access node may enter a higher power state if no other access nodes are within the defined proximity or if the one or more thresholds are not exceeded. Configuration parameters for a power state (Continued)

change procedure may be configured by control signaling from a CU.

28 Claims, 12 Drawing Sheets

(51) Int. Cl.
*H04B 17/336* (2015.01)
*H04L 1/00* (2006.01)
*H04W 92/20* (2009.01)

DYNAMICALLY CONTROLLING A POWER STATE OF A MOBILE INTEGRATED ACCESS AND BACKHAUL NODE

CROSS REFERENCE

The present application for patent claims the benefit of U.S. Provisional Patent Application No. 62/939,513 by LUO et al., entitled "DYNAMICALLY CONTROLLING A POWER STATE OF A MOBILE INTEGRATED ACCESS AND BACKHAUL NODE," filed Nov. 22, 2019, assigned to the assignee hereof, and expressly incorporated by reference herein.

FIELD OF TECHNOLOGY

The following relates generally to wireless communications and more specifically to dynamically controlling a power state of a mobile integrated access and backhaul (IAB) node.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of access nodes or network access nodes, each simultaneously supporting communication for multiple communication devices, which may be otherwise known as user equipment (UE). Network access nodes may have a high-capacity, wired, backhaul connection to the network. In some deployments, however, it may be desirable to deploy a larger quantity of access nodes (e.g., in a small area) to provide acceptable coverage to users. In such deployments, it may be impractical to connect each access node to the network via a wired connection, and some networks or portions thereof may be configured as integrated access and backhaul (IAB) networks in which one or more access nodes of the network may have wireless backhaul connections to the network.

In some IAB networks, access node mobility (e.g., a mobile IAB node) may impact network performance by causing interference between access nodes or between access nodes and UEs.

SUMMARY

The described techniques relate to improved methods, systems, devices, and apparatuses that support dynamically controlling a power state of a mobile integrated access and backhaul (IAB) node. Generally, the described techniques provide for a mobile access node (e.g., a mobile IAB node of an IAB network) to enter a first or second power state (e.g., turn on or off) based on detection of a second access node within a defined proximity. The second access node may be detected by measuring a signal strength of the second access node (e.g., if the measured signal strength is beyond a threshold) or by estimating a distance to the second access node (e.g., if the distance is beyond a threshold). The detection may be made by either the mobile access node or by an access node central unit (CU) (e.g., based on measurement reports). Either the mobile access node or the CU may determine for the mobile access node to enter the first or second power state (e.g., turn on or off) and may indicate the determination to the other device (e.g., to the CU or the mobile access node, respectively).

The mobile access node may turn off (e.g., enter a lower power state or the second power state) if it is determined that the second access node is within a defined proximity and/or if one or more other thresholds are exceeded. The mobile access node may turn on (e.g., enter a higher power state, or the first power state, after having previously turned off) if it is determined that no other access nodes are within a defined proximity or if the one or more thresholds are not exceeded. Configuration parameters (e.g., one or more triggering conditions) for a power state change procedure, such as one or more threshold parameters, may be configured by control signaling from a CU.

A method of wireless communications by a mobile access node of a wireless backhaul communications network is described. The method may include receiving control signaling indicating at least one configuration parameter associated with triggering the mobile access node to transition between a first power state and a second power state that consumes less power than the first power state and communicating, with a CU access node of the wireless backhaul communications network, a power state change indication to indicate that the mobile access node is transitioning between the first power state and the second power state corresponding to a determination that a triggering condition associated with the at least one configuration parameter is met.

An apparatus for wireless communications by a mobile access node of a wireless backhaul communications network is described. The apparatus may include a processor, memory coupled with the processor, and instructions stored in the memory. The instructions may be executable by the processor to cause the apparatus to receive control signaling indicating at least one configuration parameter associated with triggering the mobile access node to transition between a first power state and a second power state that consumes less power than the first power state and communicate, with a CU access node of the wireless backhaul communications network, a power state change indication to indicate that the mobile access node is transitioning between the first power state and the second power state corresponding to a determination that a triggering condition associated with the at least one configuration parameter is met.

Another apparatus for wireless communications by a mobile access node of a wireless backhaul communications network is described. The apparatus may include means for receiving control signaling indicating at least one configuration parameter associated with triggering the mobile access node to transition between a first power state and a second power state that consumes less power than the first power state and communicating, with a CU access node of the wireless backhaul communications network, a power state change indication to indicate that the mobile access node is transitioning between the first power state and the second power state corresponding to a determination that a triggering condition associated with the at least one configuration parameter is met.

A non-transitory computer-readable medium storing code for wireless communications by a mobile access node of a wireless backhaul communications network is described. The code may include instructions executable by a processor to receive control signaling indicating at least one configuration parameter associated with triggering the mobile access node to transition between a first power state and a second power state that consumes less power than the first power state and communicate, with a CU access node of the wireless backhaul communications network, a power state change indication to indicate that the mobile access node is transitioning between the first power state and the second power state corresponding to a determination that a triggering condition associated with the at least one configuration parameter is met.

In some examples of the method, apparatuses, and non-transitory computer-readable medium described herein, communicating the power state change indication may include operations, features, means, or instructions for communicating the power state change indication to indicate that the mobile access node may be transitioning from the first power state to the second power state corresponding to the determination based on the at least one configuration parameter that the mobile access node may be within a defined proximity of a second access node of the wireless backhaul communications network, and performing a handover procedure to handover one or more child nodes of the mobile access node to the second access node or a different access node of the wireless backhaul communications network based on communicating the power state change indication.

Some examples of the method, apparatuses, and non-transitory computer-readable medium described herein may further include operations, features, means, or instructions for transitioning to the second power state based on completion of the handover procedure.

Some examples of the method, apparatuses, and non-transitory computer-readable medium described herein may further include operations, features, means, or instructions for transmitting a measurement report indicating a measurement of the second access node, a different access node, or both, where the power state change indication may be communicated from the CU access node to the mobile access node based on the measurement report.

In some examples of the method, apparatuses, and non-transitory computer-readable medium described herein, the measurement may be a signal strength measurement, a reference signal receive power (RSRP) measurement, a reference signal received quality (RSRQ) measurement, a signal to interference plus noise ratio (SINR), or any combination thereof.

Some examples of the method, apparatuses, and non-transitory computer-readable medium described herein may further include operations, features, means, or instructions for receiving, from a child access node of the mobile access node, an indication of the measurement of the second access node, the different access node, or both.

In some examples of the method, apparatuses, and non-transitory computer-readable medium described herein, communicating the power state change indication may include operations, features, means, or instructions for receiving the power state change indication that indicates an identifier (ID) of the second access node.

In some examples of the method, apparatuses, and non-transitory computer-readable medium described herein, communicating the power state change indication may include operations, features, means, or instructions for transmitting the power state change indication that indicates an ID of the second access node.

In some examples of the method, apparatuses, and non-transitory computer-readable medium described herein, performing the handover procedure may include operations, features, means, or instructions for transmitting a handover indication to a child access node to initiate the child access node to perform a search for a new parent access node.

In some examples of the method, apparatuses, and non-transitory computer-readable medium described herein, communicating the power state change indication may include operations, features, means, or instructions for communicating the power state change indication to indicate that the mobile access node may be transitioning from the second power state to the first power state corresponding to the determination based on the at least one configuration parameter that the mobile access node may be outside of a defined proximity of a second access node of the wireless backhaul communications network.

In some examples of the method, apparatuses, and non-transitory computer-readable medium described herein, communicating the power state change indication may include operations, features, means, or instructions for transmitting the power state change indication to the CU access node based on the determination that the triggering condition may be met.

In some examples of the method, apparatuses, and non-transitory computer-readable medium described herein, communicating the power state change indication may include operations, features, means, or instructions for receiving the power state change indication from the CU access node based on the determination that the triggering condition may be met.

In some examples of the method, apparatuses, and non-transitory computer-readable medium described herein, receiving the control signaling may include operations, features, means, or instructions for receiving the control signaling that indicates that the at least one configuration parameter includes a transmission power level threshold, where the power state change indication may be communicated based on a transmission power level of the mobile access node satisfying the transmission power level threshold.

In some examples of the method, apparatuses, and non-transitory computer-readable medium described herein, receiving the control signaling may include operations, features, means, or instructions for receiving the control signaling that indicates the at least one configuration parameter that indicates to halt wireless communication by a distributed unit (DU) of the mobile access node when in the second power state.

In some examples of the method, apparatuses, and non-transitory computer-readable medium described herein, receiving the control signaling may include operations, features, means, or instructions for receiving the control signaling that indicates the at least one configuration parameter that indicates to halt wireless data communication by a DU of the mobile access node and continue to transmit synchronization signal blocks (SSBs) by the DU when in the second power state.

Some examples of the method, apparatuses, and non-transitory computer-readable medium described herein may further include operations, features, means, or instructions for transmitting the SSBs including a cell barring flag indicating that the wireless data communication may be not available from the DU when in the second power state.

Some examples of the method, apparatuses, and non-transitory computer-readable medium described herein may further include operations, features, means, or instructions for transmitting the SSBs within a window for performing an inter-relay discover procedure when in the second power state.

In some examples of the method, apparatuses, and non-transitory computer-readable medium described herein, receiving the control signaling may include operations, features, means, or instructions for receiving the control signaling that indicates the at least one configuration parameter that indicates to halt wireless data communication by a mobile termination (MT) of the mobile access node and continue to monitor SSBs by the MT when in the second power state.

Some examples of the method, apparatuses, and non-transitory computer-readable medium described herein may further include operations, features, means, or instructions for monitoring the SSBs that may be cell-defined SSBs (CD-SSBs) when in the second power state.

Some examples of the method, apparatuses, and non-transitory computer-readable medium described herein may further include operations, features, means, or instructions for monitoring the SSBs within a window for performing an inter-relay discover procedure when in the second power state.

In some examples of the method, apparatuses, and non-transitory computer-readable medium described herein, receiving the control signaling may include operations, features, means, or instructions for receiving the control signaling that indicates the at least one configuration parameter that indicates to halt wireless data communication by an MT of the mobile access node and continue to communicate one or more control signaling messages with a parent access node of the mobile access node when in the second power state.

In some examples of the method, apparatuses, and non-transitory computer-readable medium described herein, receiving the control signaling may include operations, features, means, or instructions for receiving the control signaling that indicates that the at least one configuration parameter includes a distance threshold, where the power state change indication may be communicated based on an estimated distance between the mobile access node and a second access node satisfying the distance threshold.

In some examples of the method, apparatuses, and non-transitory computer-readable medium described herein, receiving the control signaling may include operations, features, means, or instructions for receiving the control signaling that indicates that the at least one configuration parameter includes an interference level threshold, where the power state change indication may be communicated based on an interference level estimate satisfying the interference level threshold.

Some examples of the method, apparatuses, and non-transitory computer-readable medium described herein may further include operations, features, means, or instructions for generating the interference level estimate based on a measured signal strength of an interference signal or a quality metric of data communication with one or more child nodes of the mobile access node, or both.

In some examples of the method, apparatuses, and non-transitory computer-readable medium described herein, the quality metric may be a SINR, a channel quality indicator (CQI), a block error rate (BLER), or any combination thereof.

In some examples of the method, apparatuses, and non-transitory computer-readable medium described herein, receiving the control signaling may include operations, features, means, or instructions for receiving the control signaling that indicates that the at least one configuration parameter includes a power consumption level threshold, where the power state change indication may be communicated based on a power consumption measurement satisfying the power consumption level threshold.

In some examples of the method, apparatuses, and non-transitory computer-readable medium described herein, receiving the control signaling may include operations, features, means, or instructions for receiving the control signaling that indicates that the at least one configuration parameter includes a parent measurement threshold, where the power state change indication may be communicated based on a measurement, by an MT of the mobile access node, of a transmission by a parent access node of the mobile access node satisfying the parent measurement threshold.

In some examples of the method, apparatuses, and non-transitory computer-readable medium described herein, receiving the control signaling may include operations, features, means, or instructions for receiving the control signaling that indicates that the at least one configuration parameter includes a radio resource management (RRM) measurement threshold, where the power state change indication may be communicated based on an RRM measurement by an MT of the mobile access node of a transmission by a second access node satisfying the RRM measurement threshold.

In some examples of the method, apparatuses, and non-transitory computer-readable medium described herein, receiving the control signaling may include operations, features, means, or instructions for receiving the control signaling that indicates that the at least one configuration parameter includes an inter-relay discovery measurement threshold, where the power state change indication may be communicated based on an inter-relay discovery measurement by an MT of the mobile access node satisfying the inter-relay discovery measurement threshold.

In some examples of the method, apparatuses, and non-transitory computer-readable medium described herein, receiving the control signaling may include operations, features, means, or instructions for receiving the control signaling that indicates that the at least one configuration parameter includes a signal strength measurement threshold, where the power state change indication may be communicated based on a signal strength measurement of a second access node satisfying the signal strength measurement threshold.

In some examples of the method, apparatuses, and non-transitory computer-readable medium described herein, the signal strength measurement may be a RSRP measurement, a RSRQ measurement, a SINR, or any combination thereof.

In some examples of the method, apparatuses, and non-transitory computer-readable medium described herein, receiving the control signaling may include operations, features, means, or instructions for receiving the control signaling that indicates that the at least one configuration parameter includes a signal strength measurement threshold, where the power state change indication may be communicated based on a signal strength measurement of a second access node observed by a child access node satisfying the signal strength measurement threshold.

In some examples of the method, apparatuses, and non-transitory computer-readable medium described herein, the signal strength measurement may be a RSRP measurement, a RSRQ measurement, a SINR, or any combination thereof.

Some examples of the method, apparatuses, and non-transitory computer-readable medium described herein may further include operations, features, means, or instructions for receiving, from the child access node, an indication of the signal strength measurement of the second access node observed by the child access node.

In some examples of the method, apparatuses, and non-transitory computer-readable medium described herein, communicating the power state change indication may include operations, features, means, or instructions for receiving the power state change indication that indicates a time offset between reception of the power state change indication and when the transition between the first power state and the second power state is to occur, and transitioning between the first power state and the second power state based on the time offset.

In some examples of the method, apparatuses, and non-transitory computer-readable medium described herein, communicating the power state change indication may include operations, features, means, or instructions for transmitting the power state change indication that indicates a time offset between transmission of the power state change indication and when the transition between the first power state and the second power state is to occur, and transitioning between the first power state and the second power state based on the time offset.

In some examples of the method, apparatuses, and non-transitory computer-readable medium described herein, communicating the power state change indication may include operations, features, means, or instructions for transmitting an indication of a number of child access nodes that may be connected to the mobile access node, and receiving the power state change indication based on transmitting the indication of the number of child access nodes.

In some examples of the method, apparatuses, and non-transitory computer-readable medium described herein, communicating the power state change indication may include operations, features, means, or instructions for transmitting an indication of a mobility state of the mobile access node, and receiving the power state change indication based on transmitting the mobility state.

In some examples of the method, apparatuses, and non-transitory computer-readable medium described herein, communicating the power state change indication may include operations, features, means, or instructions for transmitting an indication of a power consumption level of the mobile access node, and receiving the power state change indication based on transmitting the indication of the power consumption level.

In some examples of the method, apparatuses, and non-transitory computer-readable medium described herein, receiving the control signaling may include operations, features, means, or instructions for receiving the control signaling that may be a F1-application protocol (AP) message, a medium access control (MAC) control element (CE), a radio resource control (RRC) message, or any combination thereof.

In some examples of the method, apparatuses, and non-transitory computer-readable medium described herein, communicating the power state change indication may include operations, features, means, or instructions for communicating the power state change indication that may be a F1-AP message, a MAC CE, an RRC message, or any combination thereof.

In some examples of the method, apparatuses, and non-transitory computer-readable medium described herein, the mobile access node may be an IAB node and the wireless backhaul communications network may be an IAB network.

In some examples of the method, apparatuses, and non-transitory computer-readable medium described herein, communicating the power state change indication may include operations, features, means, or instructions for receiving a first indication of a first mobility state of a second access node, and transmitting the power state change indication based on a second mobility state of the mobile access node being greater than the first mobility state.

A method of wireless communications by a CU node of a wireless backhaul communications network is described. The method may include transmitting control signaling indicating at least one configuration parameter associated with triggering a mobile access node of the wireless backhaul communications network to transition between a first power state and a second power state that consumes less power than the first power state and communicating, with the mobile access node, a power state change indication to indicate that the mobile access node is transitioning between the first power state and the second power state corresponding to a determination that a triggering condition associated with the at least one configuration parameter is met.

An apparatus for wireless communications by a CU node of a wireless backhaul communications network is described. The apparatus may include a processor, memory coupled with the processor, and instructions stored in the memory. The instructions may be executable by the processor to cause the apparatus to transmit control signaling indicating at least one configuration parameter associated with triggering a mobile access node of the wireless backhaul communications network to transition between a first power state and a second power state that consumes less power than the first power state and communicate, with the mobile access node, a power state change indication to indicate that the mobile access node is transitioning between the first power state and the second power state corresponding to a determination that a triggering condition associated with the at least one configuration parameter is met.

Another apparatus for wireless communications by a CU node of a wireless backhaul communications network is described. The apparatus may include means for transmitting control signaling indicating at least one configuration parameter associated with triggering a mobile access node of the wireless backhaul communications network to transition between a first power state and a second power state that consumes less power than the first power state and communicating, with the mobile access node, a power state change indication to indicate that the mobile access node is transitioning between the first power state and the second power state corresponding to a determination that a triggering condition associated with the at least one configuration parameter is met.

A non-transitory computer-readable medium storing code for wireless communications by a CU node of a wireless backhaul communications network is described. The code may include instructions executable by a processor to transmit control signaling indicating at least one configuration parameter associated with triggering a mobile access node of the wireless backhaul communications network to transition between a first power state and a second power state that consumes less power than the first power state and communicate, with the mobile access node, a power state change indication to indicate that the mobile access node is transitioning between the first power state and the second power state corresponding to a determination that a triggering condition associated with the at least one configuration parameter is met.

In some examples of the method, apparatuses, and non-transitory computer-readable medium described herein, communicating the power state change indication may include operations, features, means, or instructions for communicating the power state change indication to indicate that the mobile access node may be transitioning from the first power state to the second power state corresponding to the determination based on the at least one configuration parameter that the mobile access node may be within a defined proximity of a second access node of the wireless backhaul communications network, and transmitting, to the mobile access node, a handover instruction to instruct the mobile access node to handover one or more child access nodes of the mobile access node to the second access node or a different access node of the wireless backhaul communications network based on communicating the power state change indication.

Some examples of the method, apparatuses, and non-transitory computer-readable medium described herein may further include operations, features, means, or instructions for receiving a measurement report indicating a measurement of the second access node, a different access node, or both, where the power state change indication may be communicated from a CU access node to the mobile access node based on the measurement report.

In some examples of the method, apparatuses, and non-transitory computer-readable medium described herein, the measurement may be a signal strength measurement, a RSRP measurement, a RSRQ measurement, a SINR, or any combination thereof.

In some examples of the method, apparatuses, and non-transitory computer-readable medium described herein, the measurement report indicates that the measurement of the second access node, the different access node, or both, may be by a child access node.

In some examples of the method, apparatuses, and non-transitory computer-readable medium described herein, communicating the power state change indication may include operations, features, means, or instructions for receiving the power state change indication that indicates an ID of the second access node.

In some examples of the method, apparatuses, and non-transitory computer-readable medium described herein, communicating the power state change indication may include operations, features, means, or instructions for transmitting the power state change indication that indicates an ID of the second access node.

In some examples of the method, apparatuses, and non-transitory computer-readable medium described herein, transmitting the handover instruction may include operations, features, means, or instructions for transmitting a handover instruction that instructs the mobile access node to transmit a handover indication to a child access node to initiate the child access node to perform a search for a new parent access node.

In some examples of the method, apparatuses, and non-transitory computer-readable medium described herein, communicating the power state change indication may include operations, features, means, or instructions for communicating the power state change indication to indicate that the mobile access node may be transitioning from the second power state to the first power state corresponding to the determination based on the at least one configuration parameter that the mobile access node may be outside of a defined proximity of a second access node of the wireless backhaul communications network.

In some examples of the method, apparatuses, and non-transitory computer-readable medium described herein, communicating the power state change indication may include operations, features, means, or instructions for transmitting the power state change indication to the mobile access node based on the determination that the triggering condition may be met.

In some examples of the method, apparatuses, and non-transitory computer-readable medium described herein, communicating the power state change indication may include operations, features, means, or instructions for receiving the power state change indication from the mobile access node based on the determination that the triggering condition may be met.

In some examples of the method, apparatuses, and non-transitory computer-readable medium described herein, transmitting the control signaling may include operations, features, means, or instructions for transmitting the control signaling that indicates the at least one configuration parameter that indicates to halt wireless communication by a DU of the mobile access node when in the second power state.

In some examples of the method, apparatuses, and non-transitory computer-readable medium described herein, transmitting the control signaling may include operations, features, means, or instructions for transmitting the control signaling that indicates the at least one configuration parameter that indicates to halt wireless data communication by a DU of the mobile access node and continue to transmit SSBs by the DU when in the second power state.

In some examples of the method, apparatuses, and non-transitory computer-readable medium described herein, transmitting the control signaling may include operations, features, means, or instructions for transmitting the control signaling that indicates the at least one configuration parameter that indicates to continue to transmit the SSBs that include a cell barring flag indicating that the wireless data communication may be not available from the DU when in the second power state.

In some examples of the method, apparatuses, and non-transitory computer-readable medium described herein, transmitting the control signaling may include operations, features, means, or instructions for transmitting the control signaling that indicates the at least one configuration parameter that indicates to continue to transmit the SSBs within a window for performing an inter-relay discover procedure when in the second power state.

In some examples of the method, apparatuses, and non-transitory computer-readable medium described herein, transmitting the control signaling may include operations, features, means, or instructions for transmitting the control signaling that indicates the at least one configuration parameter that indicates to halt wireless data communication by an MT of the mobile access node and continue to monitor SSBs by the MT when in the second power state.

In some examples of the method, apparatuses, and non-transitory computer-readable medium described herein, transmitting the control signaling may include operations, features, means, or instructions for transmitting the control signaling that indicates the at least one configuration parameter that indicates to continue to monitor the SSBs that may be CD-SSBs when in the second power state.

In some examples of the method, apparatuses, and non-transitory computer-readable medium described herein, transmitting the control signaling may include operations, features, means, or instructions for transmitting the control signaling that indicates the at least one configuration parameter that indicates to continue to monitor the SSBs within a window for performing an inter-relay discover procedure when in the second power state.

In some examples of the method, apparatuses, and non-transitory computer-readable medium described herein, transmitting the control signaling may include operations, features, means, or instructions for transmitting the control signaling that indicates the at least one configuration parameter that indicates to halt wireless data communication by an MT of the mobile access node and continue to communicate one or more control signaling messages with a parent access node of the mobile access node when in the second power state.

In some examples of the method, apparatuses, and non-transitory computer-readable medium described herein, transmitting the control signaling may include operations, features, means, or instructions for transmitting the control signaling that indicates that the at least one configuration parameter includes a distance threshold, where the power state change indication may be communicated based on an estimated distance between the mobile access node and a second access node satisfying the distance threshold.

In some examples of the method, apparatuses, and non-transitory computer-readable medium described herein, transmitting the control signaling may include operations, features, means, or instructions for transmitting the control signaling that indicates that the at least one configuration parameter includes an interference level threshold, where the power state change indication may be communicated based on an interference level estimate satisfying the interference level threshold.

In some examples of the method, apparatuses, and non-transitory computer-readable medium described herein, the interference level estimate may be generated based on a measured signal strength of an interference signal or a quality metric of data communication with one or more child nodes of the mobile access node, or both.

In some examples of the method, apparatuses, and non-transitory computer-readable medium described herein, the quality metric may be a SINR, a CQI, a BLER, or any combination thereof.

In some examples of the method, apparatuses, and non-transitory computer-readable medium described herein, transmitting the control signaling may include operations, features, means, or instructions for transmitting the control signaling that indicates that the at least one configuration parameter includes a power consumption level threshold, where the power state change indication may be communicated based on a power consumption measurement satisfying the power consumption level threshold.

In some examples of the method, apparatuses, and non-transitory computer-readable medium described herein, transmitting the control signaling may include operations, features, means, or instructions for transmitting the control signaling that indicates that the at least one configuration parameter includes a transmission power level threshold, where the power state change indication may be communicated based on a transmission power level of the mobile access node satisfying the transmission power level threshold.

In some examples of the method, apparatuses, and non-transitory computer-readable medium described herein, transmitting the control signaling may include operations, features, means, or instructions for transmitting the control signaling that indicates that the at least one configuration parameter includes a parent measurement threshold, where the power state change indication may be communicated based on a measurement of a transmission by a parent access node of the mobile access node satisfying the parent measurement threshold.

In some examples of the method, apparatuses, and non-transitory computer-readable medium described herein, transmitting the control signaling may include operations, features, means, or instructions for transmitting the control signaling that indicates that the at least one configuration parameter includes an RRM measurement threshold, where the power state change indication may be communicated based on an RRM measurement by an MT of the mobile access node of a transmission by a second access node satisfying the RRM measurement threshold.

In some examples of the method, apparatuses, and non-transitory computer-readable medium described herein, transmitting the control signaling may include operations, features, means, or instructions for transmitting the control signaling that indicates that the at least one configuration parameter includes an inter-relay discovery measurement threshold, where the power state change indication may be communicated based on an inter-relay discovery measurement by an MT of the mobile access node satisfying the inter-relay discovery measurement threshold.

In some examples of the method, apparatuses, and non-transitory computer-readable medium described herein, transmitting the control signaling may include operations, features, means, or instructions for transmitting the control signaling that indicates that the at least one configuration parameter includes a signal strength measurement threshold, where the power state change indication may be communicated based on a signal strength measurement of a second access node satisfying the signal strength measurement threshold.

In some examples of the method, apparatuses, and non-transitory computer-readable medium described herein, the signal strength measurement may be a RSRP measurement, a RSRQ measurement, a SINR, or any combination thereof.

In some examples of the method, apparatuses, and non-transitory computer-readable medium described herein, transmitting the control signaling may include operations, features, means, or instructions for transmitting the control signaling that indicates that the at least one configuration parameter includes a signal strength measurement threshold, where the power state change indication may be communicated based on a signal strength measurement of a second access node observed by a child access node satisfying the signal strength measurement threshold.

In some examples of the method, apparatuses, and non-transitory computer-readable medium described herein, the signal strength measurement may be a RSRP measurement, a RSRQ measurement, a SINR, or any combination thereof.

In some examples of the method, apparatuses, and non-transitory computer-readable medium described herein, the signal strength measurement of the second access node may be observed by the child access node.

In some examples of the method, apparatuses, and non-transitory computer-readable medium described herein, communicating the power state change indication may include operations, features, means, or instructions for transmitting the power state change indication that indicates a time offset between reception of the power state change indication and when the transition between the first power state and the second power state is to occur.

In some examples of the method, apparatuses, and non-transitory computer-readable medium described herein, communicating the power state change indication may include operations, features, means, or instructions for receiving the power state change indication that indicates a time offset between reception of the power state change indication and when the transition between the first power state and the second power state is to occur.

In some examples of the method, apparatuses, and non-transitory computer-readable medium described herein, communicating the power state change indication may include operations, features, means, or instructions for transmitting the power state change indication to the mobile access node based on randomly selecting between the mobile access node and a second access node to determine which of the mobile access node and the second access node may be to transition to the second power state.

In some examples of the method, apparatuses, and non-transitory computer-readable medium described herein, communicating the power state change indication may include operations, features, means, or instructions for receiving a first indication of a first number of child access nodes that may be connected to the mobile access node and a second indication of a second number of child access nodes that may be connected to a second access node, and transmitting the power state change indication to the mobile access node based on the second number of child access nodes being less than the first number of child access nodes.

In some examples of the method, apparatuses, and non-transitory computer-readable medium described herein, communicating the power state change indication may include operations, features, means, or instructions for receiving a first indication of a first power consumption level of the mobile access node and a second indication of a second power consumption level of a second access node, and transmitting the power state change indication based on the second power consumption level being less than the first power consumption level.

In some examples of the method, apparatuses, and non-transitory computer-readable medium described herein, transmitting the control signaling may include operations, features, means, or instructions for transmitting the control signaling that may be a F1-AP message, a MAC CE, an RRC message, or any combination thereof.

In some examples of the method, apparatuses, and non-transitory computer-readable medium described herein, communicating the power state change indication may include operations, features, means, or instructions for communicating the power state change indication that may be a F1-AP message, a MAC CE, an RRC message, or any combination thereof.

In some examples of the method, apparatuses, and non-transitory computer-readable medium described herein, the CU node may be a CU IAB node, the mobile access node may be a mobile IAB node, and the wireless backhaul communications network may be an IAB network.

DETAILED DESCRIPTION

Figure 1:
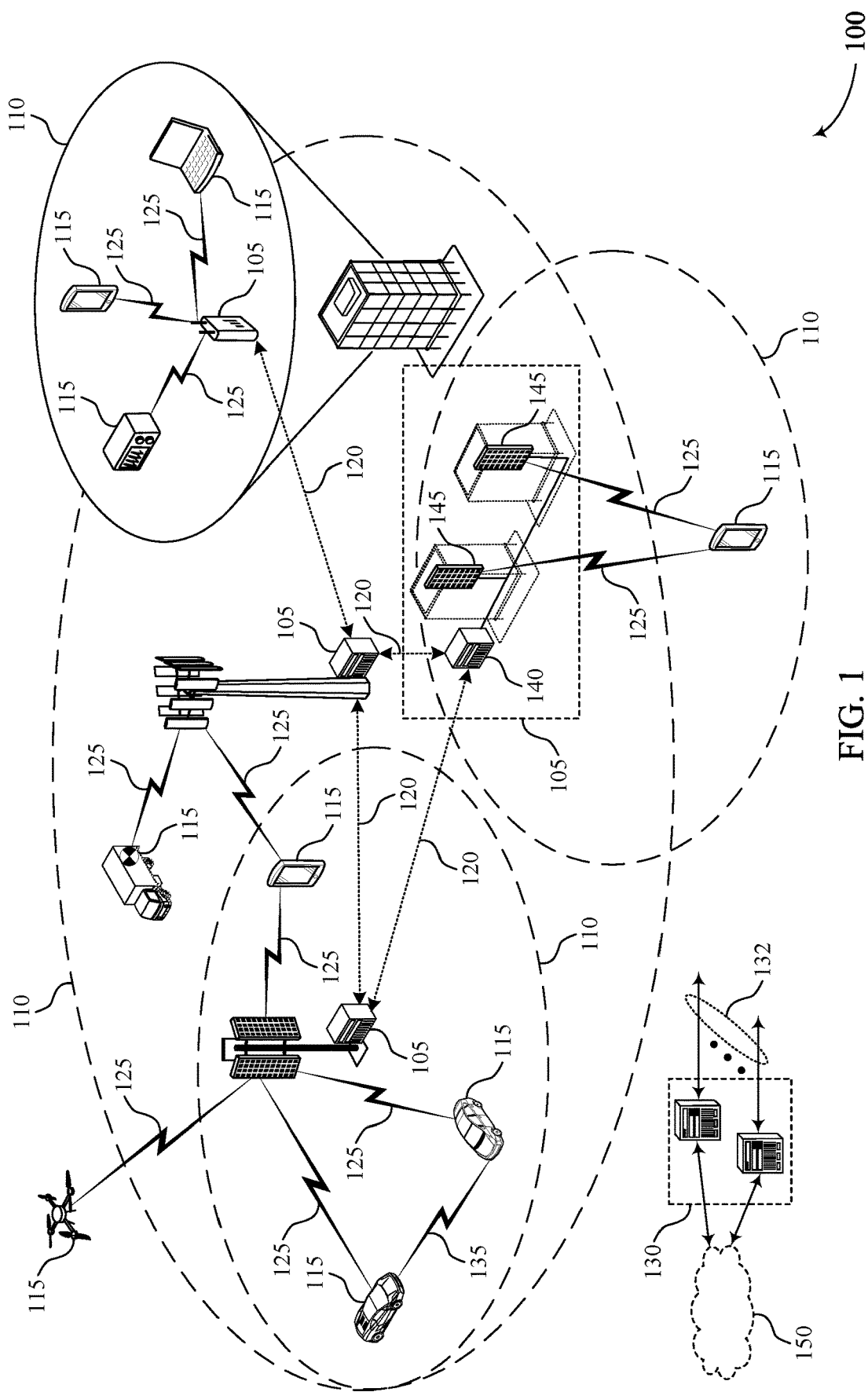
FIG. 1 illustrates an example of a wireless communications system in accordance with aspects of the present disclosure.

A mobile access node of a wireless backhaul communications network (e.g., an integrated access and backhaul (IAB) node of an IAB network) may enter a first or a second power state (e.g., turn on or off) based on detection of a second access node (e.g., a second IAB node) within a defined proximity of the mobile access node. The second access node may be detected by measuring a signal strength of the second access node (e.g., if the measured signal strength is beyond a threshold) or by estimating a distance to the second access node (e.g., if the distance is beyond or within a threshold). The detection may be made by either the mobile access node or by an access node central unit (CU) of the wireless backhaul communications network (e.g., based on measurement reports). The mobile access node may turn off (e.g., enter a lower power state or the second power state) if it is determined that the second access node is within a defined proximity and/or if one or more other parameters are met. The mobile access node may turn on (e.g., enter a higher power state, or the first power state, after having previously turned off) if it is determined that no other access nodes are within a defined proximity or if the one or more parameters are not met. Configuration parameters (e.g., one or more triggering conditions) for a power state change procedure, such as one or more threshold parameters, may be configured by control signaling from a CU.

In some wireless networks, IAB nodes may communicate with other IAB nodes via one or more wireless backhaul links and may communicate with user equipments (UEs) via one or more wireless access links. An IAB node may receive data or control information via the one or more wireless backhaul links and may forward the data or the control information to a child access node (e.g., via one or more wireless backhaul links) or to a UE (e.g., via one or more wireless access links). Some wireless networks may include a mobile IAB network, in which one or more access nodes (e.g., IAB nodes) may move, or change a physical location, within the network. A mobile IAB node may support communications with one or more child UEs and/or one or more child access nodes.

In one example, a mobile IAB node may move within a network, such that a location of the mobile IAB node may change with time. The mobile IAB node may have a coverage area, which may support communications with one or more UEs or other IAB nodes (e.g., other access nodes). In some cases, the mobile IAB node may come within a defined proximity of a second IAB node (e.g., a stationary IAB node or another mobile IAB node), such that if both the mobile IAB node and the second IAB node transmit with full power (e.g., or above a threshold power) their respective coverage areas may completely or partially overlap.

In some overlapping coverage areas, interference may occur between downlink or uplink communications associated with the two IAB nodes. Connected child nodes (e.g., UEs and/or other IAB nodes) of one or both IAB nodes may experience at least some radio link failure due to the interference. In some cases, the interference may not affect communications with the connected child nodes (e.g., when using beamforming in a millimeter wave (mmW) wireless communications system, such as a new radio (NR) system that may communicate in a frequency range 2 (FR2)), but if one or more child nodes of the mobile IAB node may be served by the second IAB node, the mobile IAB node may be redundant.

To reduce interference and/or save power, a mobile IAB node may enter a first or second power state (e.g., turn on or off) based on detection of a second IAB node within a defined proximity (e.g., detection of being within a close vicinity). The second IAB node may be detected by measuring a signal strength of the second IAB node (e.g., if the measured signal strength is beyond a threshold) or by estimating a distance to the second IAB node (e.g., if the distance is beyond or within a threshold). The detection may be made by either the mobile IAB node (e.g., based on a mobile termination (MT) signal measurement) or by a network CU (e.g., based on measurement reports).

An IAB node may turn off (e.g., enter a lower power state or the second power state) if it is determined that a second IAB node is within a defined proximity (e.g., mobile and second IAB nodes are determined to be too close) and/or if one or more other parameters are met. An IAB node may turn on (e.g., enter a higher power state, or the first power state, after having previously turned off) if it is determined that no other IAB nodes are within a defined proximity (e.g., the IAB node is far enough away from the second IAB node) and/or if one or more other parameters are not met. Configuration parameters (e.g., one or more triggering conditions) for triggering and/or completing a power state change procedure, such as one or more threshold parameters, may be configured by control signaling from a CU.

A determination to change power state (e.g., turn on or off) may be made at the mobile IAB node and indicated to the CU, or may be made at the CU and indicated to the mobile IAB node. Such an indication may be referred to as a power state change indication. Once it is determined that a mobile IAB node is to turn off (e.g., before the mobile IAB node turns off), all connected child nodes of the mobile IAB node may be handed over to another parent IAB node. The mobile IAB node may notify its child devices of the handover procedures, may perform the handover procedure, and may turn off. By turning off, the mobile IAB node may lower an amount of interference experienced by one or more UEs or other IAB nodes, or may save power, among other benefits.

As described herein, a mobile IAB node may turn off by turning off a portion of or all distributed unit (DU) signals and by turning off at least some MT communications. In some cases, the mobile IAB node may enter a low power state where it completely turns off, or operates with a reduced set of functionality. If the mobile IAB node or the CU determines (e.g., based on the one or more parameters) that the mobile IAB node is to turn on (e.g., enter a higher power state), the mobile IAB node may turn on DU signals and MT communications. The CU may initiate a handover procedure to hand over child devices (e.g., new child devices and/or previous child devices) from one or more other IAB nodes to the mobile IAB node, and the corresponding devices may perform the handover procedure.

Aspects of the disclosure are initially described in the context of wireless communications systems. Aspects of the disclosure are further illustrated by and described with reference to a process flow, apparatus diagrams, system diagrams, and flowcharts that relate to dynamically controlling a power state of a mobile integrated access and backhaul node.

FIG. 1 illustrates an example of a wireless communications system 100 in accordance with aspects of the present disclosure. The wireless communications system 100 may include one or more access nodes 105 (e.g., access nodes or access nodes), one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The access nodes 105 may be dispersed throughout a geographic area to form the wireless communications system 100 and may be devices in different forms or having different capabilities. The access nodes 105 and the UEs 115 may wirelessly communicate via one or more communication links 125. Each access node 105 may provide a geographic coverage area 110 over which the UEs 115 and the access node 105 or the access node 105 and other access nodes 105 (e.g., via an IAB network) may establish one or more communication links 125. The geographic coverage area 110 may be an example of a geographic area over which an access node 105 and a UE 115 (e.g., or an access node 105 and another access node 105) may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the access nodes 105, or network equipment (e.g., core network nodes, relay devices, IAB nodes, or other network equipment), as shown in FIG. 1.

The access nodes 105 may communicate with the core network 130, or with one another, or both. For example, the access nodes 105 may interface with the core network 130 through one or more backhaul links 132 (e.g., via an S1, N2, N3, or other interface). The access nodes 105 may communicate with one another over the backhaul links 120 (e.g., via an X2, Xn, or other interface) either directly (e.g., directly between access nodes 105), or indirectly (e.g., via core network 130), or both. In some examples, the backhaul links 120 may be or include one or more wireless links, such as in an IAB network.

One or more of the access nodes 105 described herein may include or may be referred to by a person of ordinary skill in the art as a base transceiver station, a radio access node, an access point, a network node, an access node, an IAB node, a wireless node, a radio transceiver, a NodeB, an eNodeB (eNB), a next-generation NodeB or giga-NodeB (either of which may be referred to as a gNB), a Home NodeB, a Home eNodeB, or other suitable terminology. The wireless communications system 100 may include access nodes 105 of different types (such as macro or small cell access nodes, donor access nodes including a central unit (CU) connected to the core network 130, relay access nodes including mobile-termination (MT) functionality and distributed unit (DU) functionality).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the access nodes 105 and the network equipment including macro eNBs or gNBs, small cell eNBs or gNBs, or relay access nodes, among other examples, as shown in FIG. 1.

The UEs 115 and the access nodes 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the access nodes 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, an access node 105 may be movable and therefore provide communication coverage for a moving geographic coverage area 110. In some examples, different geographic coverage areas 110 associated with different technologies may overlap, but the different geographic coverage areas 110 may be supported by the same access node 105. In other examples, the overlapping geographic coverage areas 110 associated with different technologies may be supported by different access nodes 105. The wireless communications system 100 may include, for example, a heterogeneous network in which different types of the access nodes 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of an access node 105. Other UEs 115 in such a group may be outside the geographic coverage area 110 of an access node 105 or be otherwise unable to receive transmissions from an access node 105. In some examples, groups of the UEs 115 communicating via D2D communications may utilize a one-to-many (1:M) system in which each UE 115 transmits to every other UE 115 in the group. In some examples, an access node 105 facilitates the scheduling of resources for D2D communications. In other cases, D2D communications are carried out between the UEs 115 without the involvement of an access node 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., access nodes 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the access nodes 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the access nodes, such as an access node 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or access node 105 may be distributed across various access nodes (e.g., radio heads and ANCs) or consolidated into a single access node (e.g., an access node 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the access nodes 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the access nodes 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

An access node 105 or a UE 115 may be equipped with multiple antennas, which may be used to employ techniques such as transmit diversity, receive diversity, multiple-input multiple-output (MIMO) communications, or beamforming. The antennas of an access node 105 or a UE 115 may be located within one or more antenna arrays or antenna panels, which may support MIMO operations or transmit or receive beamforming. For example, one or more access node antennas or antenna arrays may be co-located at an antenna assembly, such as an antenna tower. In some examples, antennas or antenna arrays associated with an access node 105 may be located in diverse geographic locations. An access node 105 may have an antenna array with a number of rows and columns of antenna ports that the access node 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., an access node 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

An access node 105 or a UE 115 may use beam sweeping techniques as part of beam forming operations. For example, an access node 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by an access node 105 multiple times in different directions. For example, the access node 105 may transmit a signal according to different beamforming weight sets associated with different directions of transmission. Transmissions in different beam directions may be used to identify (e.g., by a transmitting device, such as an access node 105, or by a receiving device, such as a UE 115) a beam direction for later transmission or reception by the access node 105.

Some signals, such as data signals associated with a particular receiving device, may be transmitted by an access node 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the access node 105 in different directions and may report to the access node 105 an indication of the signal that the UE 115 received with a highest signal quality or an otherwise acceptable signal quality. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and an access node 105 or a core network 130 supporting radio bearers for user plane data. At the physical layer, transport channels may be mapped to physical channels.

Access nodes 105 may support functionality for an IAB network operation. For example, the access nodes 105 may be split into one or more support entities (e.g., functionalities) for promoting wireless backhaul density in collaboration with NR communication access (e.g., via mmW technologies). In some examples, an access node 105 (e.g., a donor access node or donor IAB node) may be split into associated CU and DU entities in which one or more DUs may be partially controlled by an associated CU. The CU entity of the access node 105 may facilitate connection between the core network 130 and the access node 105 (e.g., an access node), for example, via a wireline connection or a wireless connection to the core network 130. The CU entity of the access node 105 may hold RRC and PDCP layer functions (e.g., for facilitating connections with the core network 130).

The one or more DUs of the access node 105 may control or schedule functionality for one or more additional devices (e.g., one or more additional access nodes 105 or the UEs 115) according to configured access links (e.g., communication links 125) and backhaul links 120. The one or more DUs of the access node 105 may hold RLC, MAC, and physical (PHY) layer functions (e.g., to schedule one or more additional devices). Based on the supported CU and DU entities at an access node 105, such an access node 105 may be referred to as a donor access node (e.g., an IAB donor or donor node).

Additionally, in some examples, an access node 105 may be split into associated MT and DU entities, where the MT functionality of the access node 105 may be controlled or scheduled by a DU entity of one or more other access nodes 105 (e.g., via a Uu interface). The DUs associated with such an access node 105 may be controlled by the MT functionality (e.g., by commands received via the MT functionality). In addition, the DUs of the access node 105 may be at least partially controlled by signaling messages from the CU entities of an associated donor access node (e.g., a donor node) on the configured access links and backhaul links 120 of a network connection (e.g., via an F1-application protocol (AP)). The DUs of one or more access nodes 105 may support one of multiple serving cells of a network coverage area. The DUs of the one or more access nodes 105 may control or schedule functionality for additional devices (e.g., one or more of the additional access nodes 105 or the UEs 115) according to the configured access links and backhaul links 120. Based on supported MT and DU entities at an access node 105, the access node 105 may be referred to as an intermediate access node (e.g., an IAB node or an IAB relay node).

As described herein, in wireless communications system 100, one or more access nodes 105 (e.g., donor access nodes or donor IAB nodes) may include one or more CUs and one or more DUs, in which one or more DUs associated with a donor access node may be partially controlled by a CU associated with the donor access node. A CU may be a component of a network management function, a database, a data center, or a core network 130 (e.g., a 5G NR core network (5GC)). In IAB networks, a CU (e.g., a donor access node 105) may communicate with the core network 130 (e.g., the 5GC) via a backhaul link 132 (e.g., a wireline backhaul, or a wireless backhaul). The donor access node 105 may be referred to, for example, in an IAB network, as an IAB donor and may be in communication with one or more IAB nodes (e.g., other access nodes 105) operating as one or more DUs relative to the IAB donor and one or more UEs 115.

For example, an IAB network may include a chain of wireless devices starting with a donor access node 105 (e.g., a radio access network (RAN) node that terminates an interface with the core network 130) and ending with a UE 115, with any number of relay nodes in between. Intermediate or relay access nodes 105 (e.g., intermediate access nodes 105, parent access nodes 105, child access nodes 105, IAB nodes, relay access nodes 105, relay nodes) may support MT functionality controlled and scheduled by an IAB donor, or another access node 105, such as a parent access node 105. Such access nodes 105 may also support DU functionality relative to one or more additional entities (e.g., IAB nodes and UEs 115) within the relay chain or configuration of the access network (e.g., downstream). In some examples, MT functionality may refer to an implementation that supports at least some aspects of an MT or a UE 115. These relay mechanisms may forward traffic along to the additional entities, extend the range of wireless access for one or more access nodes 105, or enhance the density of backhaul capability within serving cells.

In some examples, wireless communications system 100 may employ one or more wired and wireless backhaul links for establishing connectivity between a core network (e.g., the core network 130) and the one or more wireless nodes within the wireless communications system 100. For example, the wireless communications system 100 may include multiple access nodes 105 (such as access nodes or remote radio heads), in which at least one access node 105 is coupled with a wireline backhaul link (e.g., backhaul link 132), such as an optical fiber cable. Additional access nodes 105 may not be directly coupled with the core network 130 or to another access nodes 105 via a wired backhaul link 120, and may use wireless backhaul links 120 to communicate backhaul traffic. In such cases, the access nodes 105 may wirelessly communicate backhaul access traffic to a high-capacity fiber point (e.g., a location in which an access node is coupled with a wireline link to core network 130). A backhaul link 132 (e.g., a wireline link) may carry packets from the one or more established PDN gateways through an interface and subsequently direct the packets through the core network and to the coupled wireless nodes over the interface.

A mobile access node 105 (e.g., a mobile IAB node) may move within a network (e.g., an IAB network), such that a physical geographic location of the mobile access node 105 may change with time. In some cases, the mobile access node 105 may come within a defined proximity of a second access node 105, such that their respective coverage areas may completely or partially overlap, causing interference between downlink or uplink communications associated with the two access nodes 105. In some cases, the interference may not affect communications with connected child nodes, but if one or more child nodes of the mobile access node 105 may be served by the second access node 105, the mobile access node 105 may be redundant.

To reduce interference and/or save power, a mobile access node 105 may enter a first or second power state (e.g., turn on or off) based on detection of a second access node 105 within a defined proximity. The second access node 105 may be detected by measuring a signal strength of the second access node 105 (e.g., if the measured signal strength is beyond a threshold) or by estimating a distance to the second access node 105 (e.g., if the distance is beyond or within a threshold). Upon detection, the mobile access node 105 or a CU access node 105 may determine (e.g., based on one or more configuration parameters) whether the mobile access node is to enter the first or second power state (e.g., turn on or off), and may indicate the determination to the other device (e.g., to the CU access node 105 or the mobile access node 105, respectively).

A mobile access node 105 node may turn off (e.g., enter a lower power state or the second power state) if it is determined that the second access node 105 is within a defined proximity and/or if one or more other thresholds are exceeded. A mobile access node 105 may turn on (e.g., enter a higher power state, or the first power state, after having previously turned off) if it is determined that no other access nodes 105 are within a defined proximity and/or if one or more other parameters are not exceeded. Configuration parameters (e.g., one or more triggering conditions or thresholds) for triggering and/or completing a power state change procedure may be configured by control signaling from the CU access node 105.

Figure 2:
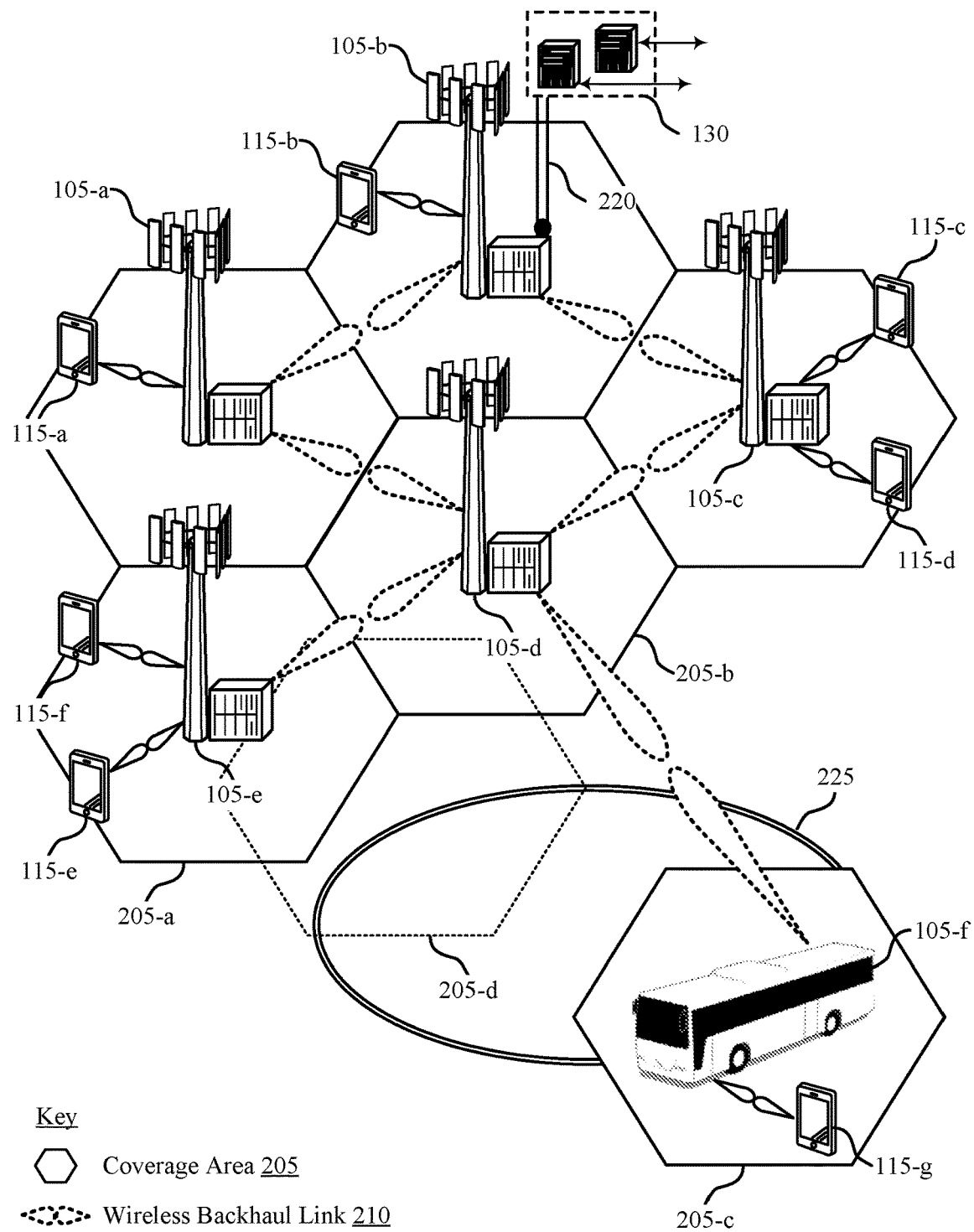
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communication system 100. For example, wireless communications system 200 may include one or more UEs 115 and one or more access nodes 105, which may be examples of UEs 115 and access nodes 105 described with reference to FIG. 1. One or more of the access nodes 105 (e.g., access node 105-b, which may include a CU entity) may be connected to a core network 130 via a wireline backhaul connection 220. Infrastructure and spectral resources for network access within the wireless communications system 200 may additionally support one or more wireless backhaul links 210 between the access nodes 105. For example, the wireless backhaul links 210 may support an IAB network architecture, with the access nodes 105 serving as IAB nodes.

Access nodes 105 may communicate with other access nodes 105 via one or more wireless backhaul links 210 and may communicate with UEs 115 (e.g., within a corresponding coverage area 205 of an access node 105) via one or more wireless access links 215. As described with reference to FIG. 1, an access node 105 may receive data or control information via the one or more wireless backhaul links 210 and may forward the data or the control information to a child access node 105 (e.g., via one or more wireless backhaul links 210) or to a UE 115 (e.g., via one or more wireless access links 215).

In some cases, wireless communications system 200 may represent a mobile IAB network, in which one or more access nodes 105 (e.g., IAB nodes) may move, or change a physical location, within the network. An IAB node that moves within the network may be referred to as a mobile IAB node, and a mobile IAB network may include any combination of stationary and mobile IAB nodes. Examples of a mobile IAB node may include an IAB node installed on a bus, train, or taxi, among other examples.

A mobile IAB node may support communications with one or more child UEs 115 via one or more wireless access links 215. In some cases, a mobile IAB node may additionally support communications with one or more child IAB nodes via one or more wireless backhaul links 210. In some other cases, a mobile IAB node may be unable to support communications with a child IAB node (e.g., due to mobility features of the mobile IAB node) and may therefore be a "leaf" network node, or a last-hop IAB node (e.g., may support access communications with one or more child UEs 115 and no other child nodes, such as child access nodes 105).

In one example, access node 105-*f* may represent a mobile IAB node (e.g., installed on a bus or other transportation system). Access node 105-*f* may traverse a path 225 (e.g., a route) within the network (e.g., may move within the network), such that a location of access node 105-*f* may change over time. Access node 105-*f* may have a coverage area 205-*c*, which may support communications with one or more UEs 115 (e.g., UEs 115 on board access node 105-*f* or within coverage area 205-*c*), such as UE 115-*g*. In some cases, access node 105-*f* may additionally support communications with other access nodes 105 within or adjacent to coverage area 205-*c*.

As a mobile IAB node moves within the network, the mobile IAB node may be assigned a new parent node based on a current location, where changing a parent node may be achieved through a topology adaptation procedure (e.g., performed according to a wireless communications standard). In some cases, the topology adaptation procedure may be directed by a CU unit (e.g., associated with access node 105-*b*) of the IAB network. In one example, access node 105-*d* may be a parent node to access node 105-*f*, but as access node 105-*f* traverses path 225, access node 105-*f* may change to another parent node (e.g., access node 105-*c* or 105-*e*) as directed by the CU (e.g., access node 105-*b*).

In some cases, a mobile IAB node may come within a defined proximity of a second IAB node (e.g., a stationary or a mobile IAB node), such that if both the mobile IAB node and the second IAB node transmit with full power (e.g., or above a threshold power) their respective coverage areas 205 may overlap (e.g., completely or partially overlap). For example, access node 105-*f* may traverse one or more locations on path 225 where coverage area 205-*c* may additionally be represented by coverage area 205-*d*, which may overlap with coverage area 205-*a* and/or coverage area 205-*b* (e.g., overlap with all or a portion of coverage areas 205-*a* and/or 205-*b*). In some overlapping coverage areas 205, interference may occur between communications (e.g., downlink or uplink) associated with the mobile IAB node (e.g., access node 105-*f*) and with the second node (e.g., access node 105-*d* and/or access node 105-*e*).

In some cases, connected child nodes (e.g., UEs 115 and/or other access nodes 105) of one or both IAB nodes may experience at least some radio link failure due to interference. In some cases, the interference may not affect communications with the connected child nodes. However, if one or more child nodes (e.g., UE 115-*g*) of the mobile IAB node (e.g., access node 105-*f*) may be served by the second IAB node (e.g., access node 105-*d* or 105-*e*), the mobile IAB node may be redundant.

Accordingly, to reduce interference and/or save power, a mobile IAB node may enter a first or second power state (e.g., turn on or off) based on detection of a second IAB node (e.g., a stationary IAB node, another mobile IAB node, a parent IAB node of the mobile IAB node) within a defined proximity of the mobile IAB node. In some cases, the second power state may consume less power than the first power state. An IAB node may turn off (e.g., enter a lower power state or the second power state) if it is determined that a second IAB node is within a defined proximity or if one or more threshold parameters are exceeded. An IAB node may turn on (e.g., enter a higher power state or the first power state, after having previously turned off) if it is determined that no other IAB nodes are within a defined proximity or if one or more threshold parameters are not exceeded.

The second IAB node may be detected by a measured signal strength of the second IAB node (e.g., if the measured signal strength is beyond a threshold) or by a distance to the second IAB node. The detection may be made by either the mobile IAB node (e.g., based on an MT signal measurement) or by a network CU (e.g., based on measurement reports).

A determination to change power state (e.g., turn on or off) may be made at the mobile IAB node and indicated to the CU, or may be made at the CU and indicated to the mobile IAB node. Such an indication may be referred to as a power state change indication. Configuration parameters (e.g., one or more triggering conditions) for triggering and/or completing a power state change procedure, such as one or more threshold parameters, may be configured by control signaling from a CU (e.g., via one or more of an F1-AP message, RRC message, or MAC control element (CE)). In some cases, the mobile IAB node may change power state based on one or more other configured parameters, in addition to detecting the second IAB node. If it is determined that a mobile IAB node is to turn off (e.g., before the mobile IAB node turns off), all connected child nodes of the mobile IAB node may be handed over (e.g., via a CU) to another parent IAB node. As described herein, a mobile IAB node may turn off by turning off a portion or all of DU signals and by turning off some MT communications.

A CU (e.g., associated with access node 105-*b*) may transmit control signaling to configure access node 105-*f* (e.g., among other access nodes 105) with one or more parameters for triggering or completing a power state change procedure (e.g., one or more triggering conditions). At one or more locations along path 225, coverage area 205-*c* of access node 105-*f* may overlap with one or more other coverage areas 205 (e.g., coverage area 205-*d* may overlap with coverage areas 205-*a* and/or 205-*b*). At the one or more locations, access node 105-*f* or the CU may use the one or more parameters to detect that another access node 105 (e.g., access node 105-d or 105-e) is within a defined proximity of access node 105-f (e.g., if one or more triggering conditions are met). Similarly, access node 105-f or the CU may use one or more parameters to determine that access node 105-f is to turn off (e.g., enter a lower power state).

The device that performs the determining may notify the other device (e.g., the CU or access node 105-f, respectively) of the determination via a power state change indication. The CU may initiate a handover procedure to hand over child devices (e.g., UE 115-g) from access node 105-f to one or more other access nodes 105 (e.g., access node 105-d or 105-e). Access node 105-f may notify its child devices of the handover procedures, may perform the handover procedure, and may turn off. By turning off, access node 105-f may reduce an amount of interference experienced by one or more UEs 115 or other access nodes 105, or may save power, among other benefits.

In some cases, access node 105-f may continue following path 225, such that coverage area 205-c may not overlap with other coverage areas 205. Access node 105-f or the CU may determine (e.g., based on one or more parameters) that no other access nodes 105 are within (e.g., or detected within) a defined proximity of access node 105-f and may determine (e.g., based on one or more parameters) that access node 105-f is to turn on (e.g., enter a higher power state). The device that performs the determining may notify the other device (e.g., the CU or access node 105-f, respectively) of the determination via a power state change indication, and access node 105-f may turn on. The CU may initiate a handover procedure to hand over child devices (e.g., new child devices and/or previous child devices, such as UE 115-g) from one or more other access nodes 105 (e.g., access node 105-d or 105-e) to access node 105-f, and the corresponding devices may perform the handover procedure.

Figure 3:
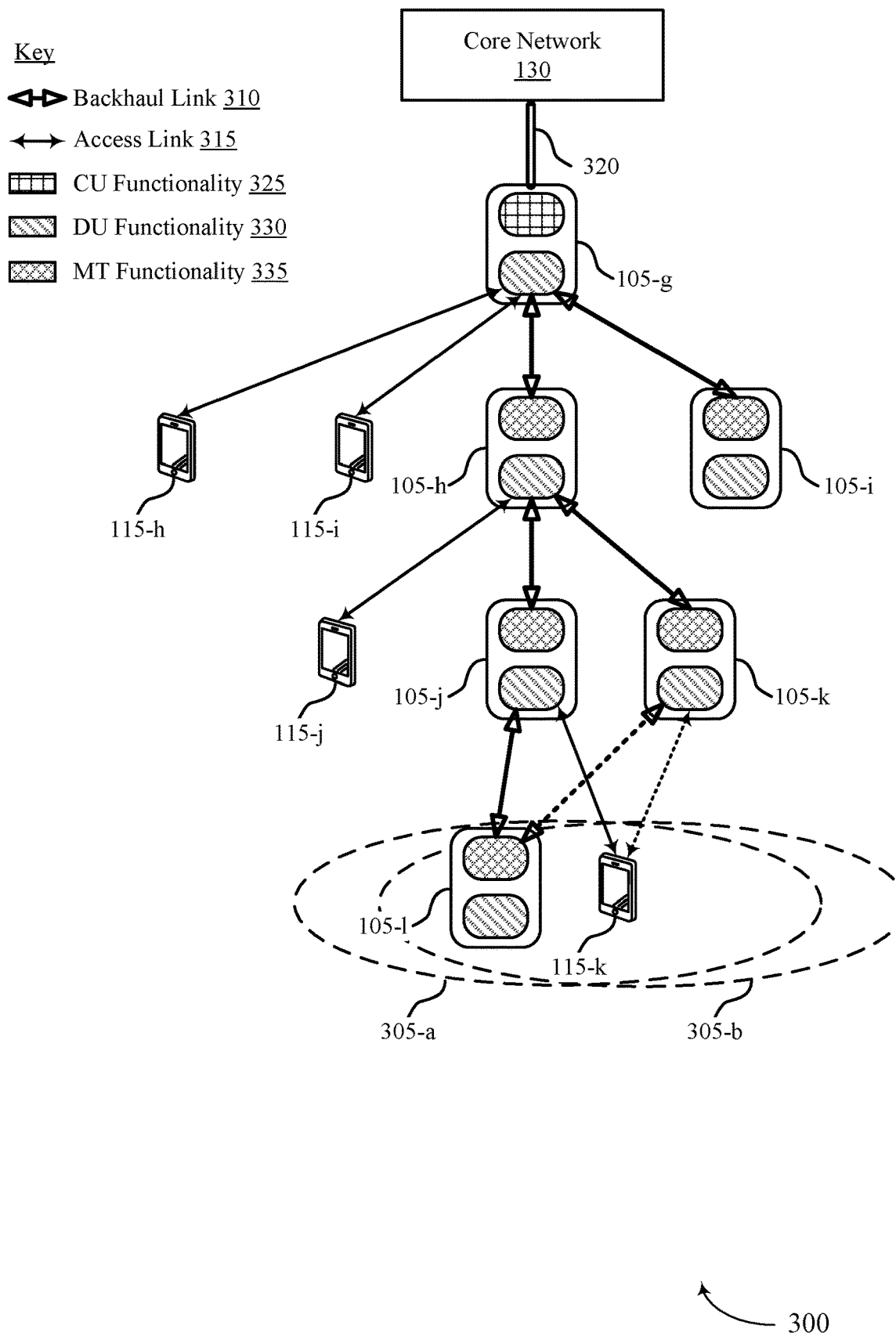
FIG. 3 illustrates an example of a wireless communications system in accordance with aspects of the present disclosure.

FIG. 3 illustrates an example of a wireless communications system 300 in accordance with aspects of the present disclosure. In some examples, wireless communications system 300 may implement aspects of wireless communications systems 100 or 200. For example, wireless communications system 300 may be an NR system that supports the sharing of infrastructure and spectral resources for NR access with wireless backhaul link capabilities, supplementing wireline backhaul connections, and providing an IAB network architecture. For example, wireless communications system 300 may represent a mobile IAB network, where one or more access nodes 105 may be mobile (e.g., may move, or change location) within the network and where one or more access nodes 105 may be stationary.

Wireless communications system 300 may include a donor access node 105-g (such as a donor IAB node or donor base station) split into an associated CU 325 functionality and an associated DU 330 functionality. The DU 330 associated with the donor access node 105-g may be partially controlled by the CU 325 of the access node 105-g. In some examples, the CU 325 and the DU 330 may be located within a single device. In other examples, the DU 330 of the donor access node 105-g may be externally located, and may be in wired or wireless communication with the CU 325. The CU 325 of the donor access node 105-g may communicate with the core network 130 over a backhaul connection 320, for example, an NG interface (which may be an example of a portion of a backhaul link). A DU 330 of donor access node 105-g (e.g., of an IAB network) may support network coverage according to connections associated with backhaul links 310 and access links 315 of the IAB network. The DU 330 of the donor access node 105-g may control one or more of the access links 315 and the backhaul links 310 within the corresponding network coverage and provide controlling and scheduling for child devices such as relay access nodes 105 (e.g., IAB nodes) or UEs 115.

Each remaining access node 105 may be split into associated MT 335 and DU 330 functionalities (e.g., entities). The MT 335 of each access node 105 may be controlled or scheduled by one or more antecedent (e.g., parent) access nodes 105 (e.g., parent IAB nodes). For example, an access node 105 may be controlled or scheduled by donor access node 105-g, or another upstream access node 105. A DU 330 of an access node 105 may be partially controlled by signaling messages from the CU 325 of the associated donor access node 105-g (e.g., or additional CUs 325) of the network connection (e.g., via an F1-AP interface). The DU 330 may schedule one or more of the child access nodes 105 or UEs 115, and may control one or more of the access links 315 or the backhaul links 310 under its coverage.

An MT 335 of an access node 105 may act as or serve as a scheduled node (e.g., similar to a UE 115) scheduled by a parent access node of the MT 335 (e.g., access node 105-h may be scheduled by access node 105-g). The DU 330 of the access node 105 may act as or serve as a scheduling node that schedules child devices of the access node 105 (such as a UE 115 or a child access node 105). The DU 330 of the donor access node 105-g may also schedule child IAB nodes downstream in the relay chain (such as an access node 105-1). An access node 105 operating as an IAB access node may relay communications between an access node 105 operating as a parent access node (e.g., an IAB donor or an IAB node upstream or higher on the relay chain) and an access node 105 operating as a child access node (e.g., an IAB node downstream or lower on the relay chain), or a UE 115. The mobile IAB network may share resources between access links 315 and backhaul links 310, and may reuse some aspects of access network frameworks.

In some examples described herein, access node 105-j may represent a mobile IAB node that may move within the network. Access node 105-j may serve an access node 105-1 and a UE 115-k (e.g., as child nodes) within a coverage area 305-a. A second access node 105-k (e.g., a stationary node) may have a second coverage area 305-b. In some cases, as described with reference to FIG. 2, access node 105-j may move such that coverage area 305-a overlaps with one or more other coverage areas 305 of one or more other access nodes 105. For example, coverage area 305-a may partially or fully overlap with coverage area 305-b at one or more locations of access node 105-j.

The CU 325 may be configured with or may determine one or more parameters associated with changing power states for access nodes 105 that are attached or associated with the CU 325. The CU 325 may transmit control signaling (e.g., via one or more of an F1-AP interface, a MAC CE, or an RRC message) indicating the one or more parameters to the access nodes 105. The CU 325 may determine or be configured with a distance threshold, an interference level threshold, a parent measurement threshold, a radio resource management (RRM) threshold, an inter-relay discover measurement threshold, and/or a signal strength measurement threshold, which may each represent an example of a triggering condition. A triggering condition may be used to detect one or more other access nodes 105 within a defined proximity of a mobile access node 105 (e.g., a mobile IAB node, such as access node 105-j). The CU 325 may additionally determine or be configured with a power consumption level threshold and/or a transmission power level threshold, where a determination to change power state may be made based on such thresholds.

As access node 105-*j* moves within the network, one or more other access nodes 105 (e.g., stationary or mobile access nodes 105) may be detected within a defined proximity of access node 105-*j*. For example, an access node 105 may be detected based on one or more triggering conditions configured or established by the CU 325 via the control signaling. In some cases, a detected access node 105 may be a parent node of access node 105-*j* (e.g., of the mobile IAB node). An access node 105 may be detected by access node 105-*j* or by the CU 325 (e.g., of access node 105-*g*). For example, access node 105-*j* may detect a second access node 105 (e.g., access node 105-*k*) via an MT 335 of access node 105-*j*. In some cases, the second access node 105 may be detected by estimating a distance between access node 105-*j* and the second access node 105, where the estimated distance may exceed the configured distance threshold. If the estimated distance is less than or equal to the threshold, the second access node may be undetected, or outside the defined proximity of access node 105-*j*.

Additionally or alternatively, the MT 335 may detect the second access node 105 (e.g., access node 105-*k*) via a measurement on a parent node (e.g., access node 105-*h*), via RRM measurements for a potential handover candidate, or via a measurement for inter-relay discovery (e.g., to discover other access nodes 105). For example, if any of these measurements exceeds the respective configured threshold, the second access node 105 may be detected to be in close proximity to another IAB node (e.g., access node 105-*j*). If any of the measurements is less than or equal to a respective threshold, the second access node 105 may be undetected or may be outside the defined proximity of another IAB node (e.g., access node 105-*j*).

The CU 325 may detect a second access node 105 (e.g., access node 105-*k*) is in close proximity to another IAB node via measurement reports (e.g., including parent node, RRM, or inter-relay measurements) received from access node 105-*j* (e.g., the mobile IAB node) or from UE 115-*k*, or from other access nodes 105, such as access node 105-1 (e.g., child nodes of the mobile IAB node). For example, if a measurement of the measurement reports satisfies the respective configured threshold, the second access node 105 may be detected to be in close vicinity of another IAB node (e.g., access node 105-*j*) by the CU 325. Access node 105-*j* may additionally or alternatively detect the second access node 105 to be in close vicinity if any of the above measurements satisfies the respective configured threshold.

In some cases, the second access node 105 (e.g., access node 105-*k*) may be considered detected within a defined proximity of access node 105-*j* if a measured signal strength or an interference level (e.g., measured by access node 105-*j* or a child node) of the second access node 105 exceeds the respective configured threshold. If the measured signal strength or interference level is less than or equal to the respective configured threshold, the second access node may be undetected or outside the defined proximity. Examples of measured signal strength may include one or more of a reference signal receive power (RSRP), reference signal received quality (RSRQ), or signal to interference plus noise ratio (SINR), among other examples. An interference level may be estimated based on a measured strength of an interference signal (e.g., from the second access node 105).

Additionally or alternatively, the interference level may be estimated by a quality metric for communications with a child node of access node 105-*j*, such as one or more of a block error rate (BLER), a channel quality indicator (CQI), or an SINR, among other examples. For example, a low SINR or CQI, or a high BLER, may indicate that access node 105-*j* experiences interference from the second access node 105. A child node may transmit an indication of a measurement of signal strength or interference to access node 105-*j*, which access node 105-*j* may use to detect the second access node 105 or may include in a measurement report to the CU 325.

If the second access node 105 (e.g., access node 105-*k*) is detected, access node 105-*j* or the CU 325 may determine whether to change a power state of access node 105-*j* (e.g., turn access node 105-*j* on or off). This determination may be made based on the detection of the second access node 105. In some cases, the determination may additionally be based on interference conditions at child nodes in the overlapping coverage areas, a power consumption at access node 105-*j*, or a transmission power of access node 105-*j*. For example, in FR2 with a narrow serving beam, communications at child nodes in overlapping coverage areas may be largely unaffected by interference (e.g., from communications associated with another access node 105). As such, it may be decided to delay turning off access node 105-*j* until higher interference is observed, for example, via a BLER or CQI report from a child node (e.g., UE 115-*k*, access node 105-1, or any child nodes of access node 105-*k*). For example, if an observed interference level satisfies a configured interference level threshold and the second access node 105 has been detected, the CU 325 or the access node 105-*j* may determine to turn off access node 105-*j*.

In some cases, if interference does not affect child nodes in the overlapping coverage areas, it may be determined to turn off access node 105-*j* for power saving purposes (e.g., because any child nodes of access node 105-*j* may be served by one or more other access nodes 105). For example, if a power consumption level measurement at access node 105-*j* satisfies a configured power consumption measurement threshold and the second access node 105 has been detected, the CU 325 or the access node 105-*j* may determine to turn off access node 105-*j*. In some cases, it may be determined to turn off access node 105-*j* because a transmit power (e.g., minimum transmit power) of an MT 335 of access node 105-*j* may cause receiver overflow or relatively high interference at one or more other access nodes 105 (e.g., access node 105-*k*). For example, if a transmission power level of access node 105-*j* satisfies a configured transmission power level and the second access node 105 has been detected, the CU 325 or the access node 105-*j* may determine to turn off access node 105-*j*.

If the second access node 105 (e.g., and any other access nodes 105) are undetected using one or more triggering conditions, the CU 325 or access node 105-*j* may determine for access node 105-*j* to turn on (e.g., change to a higher power state). For example, if no access nodes 105 are detected within a defined proximity of access node 105-*j* using the methods described herein, the CU 325 or access node 105-*j* may determine for access node 105-*j* to turn on.

If access node 105-*j* determines to change a power state (e.g., turn on or off), access node 105-*j* may transmit a power state change indication to the CU 325 (e.g., via one or more of an F1-AP interface, a MAC CE, or an RRC message) indicating that access node 105-*j* is to turn on or off. Additionally or alternatively, access node 105-*j* may transmit a request message to the CU 325 indicating a request to turn on or off. If the CU 325 determines to change the power state of access node 105-*j* (e.g., based on measurement reports or a request message), the CU 325 may transmit a power state change indication to access node 105-*j* (e.g., via one or more of an F1-AP interface, a MAC CE, or an RRC message) indicating for access node 105-*j* to turn on or off.

After transmitting or receiving a power state change indication, the CU 325 may initiate a handover procedure for child nodes of access node 105-*j* (e.g., UE 115-*k* and access node 105-1). In the case of turning off, the handover procedure may transfer the child nodes to another access node 105 (e.g., access node 105-*k*), and in the case of turning on, the handover procedure may transfer the child nodes to access node 105-*j*. In some cases, a power state change indication may further include one or more parameters, such as an action time for turning on or off or an identifier (ID) of a detected access node 105 (e.g., access node 105-*k*). An action time may indicate a time offset between reception of the power state change indication and when the transition to turn on or off is to occur.

In some cases, it may be determined (e.g., by access node 105-*j* or by the CU 325) that the child nodes are to be handed over to the detected, second access node 105 (e.g., access node 105-*k*). In such cases, the determination may be made without reference to a handover measurement report, and may in some cases be based on the determination that the second access node 105 is within a defined proximity of access node 105-*j*. In some other cases, a child node may be informed of the upcoming power state change procedure, and the child node may search for a new parent node by performing one or more signal measurements. The child node may transmit a measurement report (e.g., based on the one or more signal measurements) to the CU 325 for handover to a parent access node 105, and the CU 325 may determine the new parent access node (e.g., the second access node 105 or a different access node 105) based on the measurement report. The child node may transmit the measurement report via a current parent access node 105 (e.g., access node 105-*j*).

If access node 105-*j* turns off (e.g., enters a second, or lower, power state), it may adopt one or more conditions for its DU 330 and/or MT 335. The conditions adopted by the DU 330 and/or MT 335 may be indicated by the CU 325 via one or more configuration parameters (e.g., communicated via the control signaling) or may be determined by access node 105-*j*. For example, turning off may include shutting down all DU signals (e.g., halting wireless data communication), or may include shutting down all DU signals and continuing to transmit synchronization signal blocks (SSBs). In some cases, when turned off, the DU 330 may transmit cell-defined SSBs (CD-SSBs) with a cell-barring flag turned on, such that the SSBs may indicate that wireless data communication is unavailable for the DU 330. When turned off, the DU 330 may transmit SSBs within an SSB timing configuration (STC) window for inter-relay discovery procedures (e.g., discovery by one or more other access nodes 105).

Turning off may further include stopping MT communications with a parent node (e.g., access node 105-*h*) except for monitoring signal quality (e.g., monitoring CD-SSBs, inter-relay discovery SSBs). In some cases, the MT 335 may maintain some communications with the parent node (e.g., access node 105-*h*), such as signaling related to power state changes. For example, the MT 335 may continue to transmit or receive control signaling. Turning on may include renewing any communications or signaling that was stopped when turning off. Access node 105-*j* may turn on or off based on the action time included in the power state change indication. The features provided by the DU 330 and/or MT 335 in the second power state (e.g., the low power state) may be indicated to access node 105-*j* (e.g., the mobile access node 105) by a configuration received from the CU 325, or the access node 105-*j* may autonomously determine which features to provide by the DU 330 and/or MT 335 in the second power state.

In some cases, two mobile access nodes 105 may be detected (e.g., may detect each other or may be detected by the CU 325) within a defined proximity of each other. For example, access node 105-*k* may also represent a mobile IAB node and access nodes 105-*j* and 105-*k* may be detected to be within a defined proximity of each other. In such cases, one of the access nodes 105 may be randomly selected to turn off or may be selected to turn off based on one or more factors. The CU 325, or one or both of the two mobile access nodes 105, may determine which access node 105 is to turn off. In an example where the CU 325 makes the determination, the CU 325 may indicate (e.g., via a power state change indication) to the selected access node 105 (e.g., access node 105-*j*) that the access node 105 is to turn off. In an example where one or both of the two mobile access nodes 105 makes the determination, the two access nodes 105 may exchange signaling to determine and notify each other of which access node 105 is to turn off (e.g., via a MAC CE, or via an F1-AP message communicated via the CU 325).

A mobile access node 105 may be selected to turn off based on a number of child nodes, a mobility state, or an amount power consumption. One or more of these parameters may be communicated between the two access nodes 105 or may be communicated by one or both of the access nodes 105 to the CU 325 (e.g., in order to make the determination). In one example, a mobile access node 105 with a lower number of connected child nodes (e.g., UEs 115 and other access nodes 105) may be selected to turn off (e.g., such that a handover burden is less). In some cases, a mobile access node 105 with a higher mobility or with a higher power consumption may be selected to turn off, such that a more stable access node 105 or an access node 105 with more access to power may remain turned on.

Figure 4:
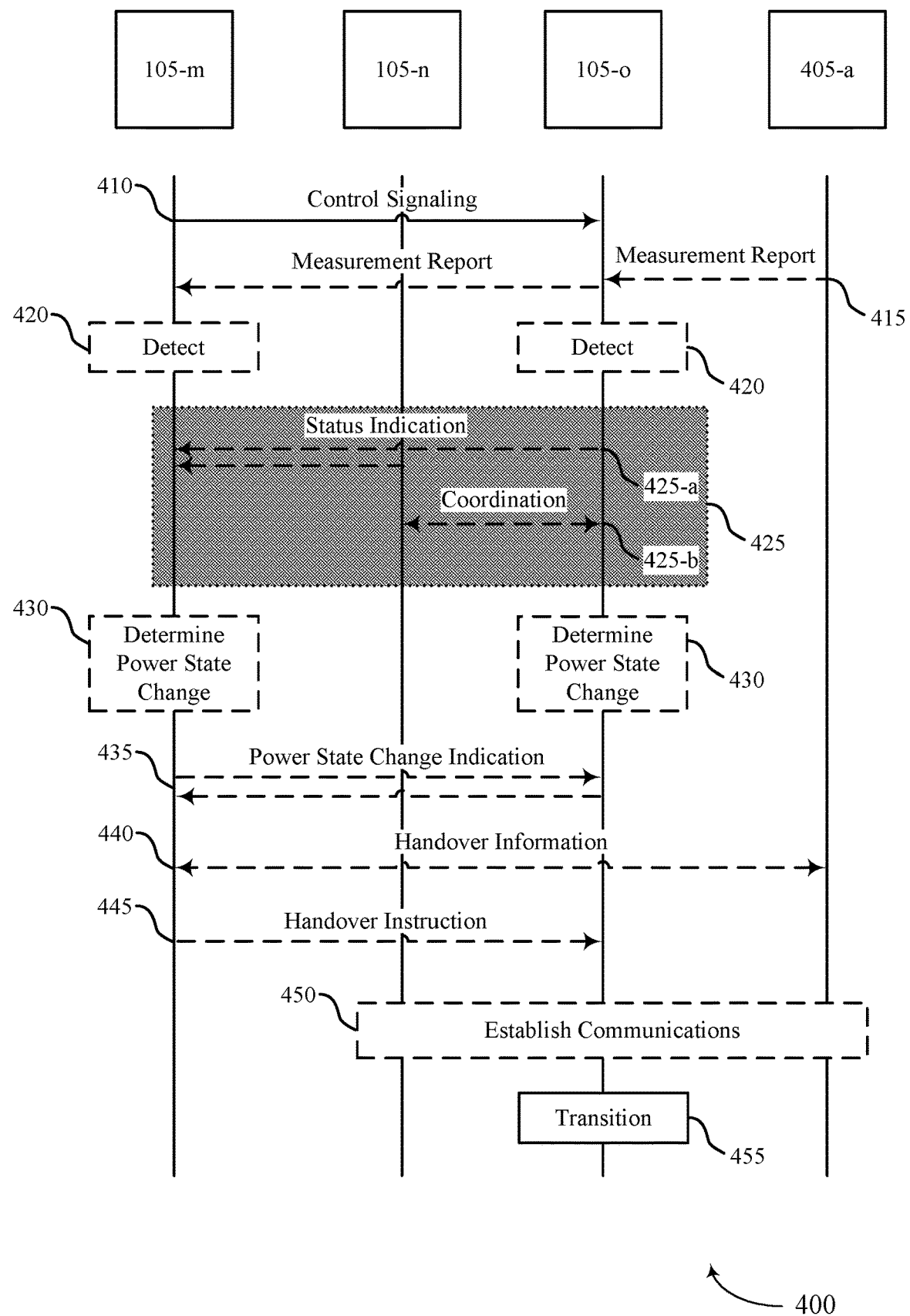
FIG. 4 illustrates an example of a process flow in accordance with aspects of the present disclosure.

FIG. 4 illustrates an example of a process flow 400 in accordance with aspects of the present disclosure. In some examples, process flow 400 may implement aspects of wireless communications systems 100, 200, or 300. Process flow 400 may be implemented by access nodes 105-*m*, 105-*n*, and 105-*o*, as well as child node 405-*a*, which may be examples of access nodes 105 and a child node as described with reference to FIGS. 1-3. Access node 105-*m* may be an example of a donor access node 105 described with reference to FIGS. 2 and 3 and may include a CU. Access nodes 105-*n* and 105-*o* may be examples of access nodes associated with access node 105-*m* (e.g., controlled by the CU) and may form part of a mobile IAB network including access nodes 105-*m*, 105-*n*, and 105-*o* and child node 405-*a*.

Access node 105-*o* may be an example of a mobile IAB node, as described with reference to FIGS. 1-3. Child node 405-*a* may be an example of a UE 115 or an access node 105, as described with reference to FIGS. 1-3. In some cases, child node 405-*a* may represent a child node of access node 105-*o* (e.g., if access node 105-*o* is turned on or in a higher power state). In some other cases, child node 405-*a* may represent a child node of access node 105-*n* (e.g., if access node 105-*o* is turned off or in a lower power state). In some cases, access node 105-*o* may move within the network such that access node 105-*o* may be located within a defined proximity of access node 105-*n* (e.g., or another access node 105 of the mobile IAB network). In such cases, access nodes 105-*m*, 105-*n*, and 105-*o* and child node 405-*a* may perform one or more power state change procedures according to the methods described herein.

In the following description of the process flow 400, the operations may be transmitted in a different order than the exemplary order shown, or the operations may be performed in different orders or at different times. Some operations may also be left out of the process flow 400, or other operations may be added to the process flow 400. It is to be understood that while access nodes 105-*m*, 105-*n*, and 105-*o* and child node 405-*a* are shown performing a number of the operations of process flow 400, any wireless device may perform the operations shown.

At 410, access node 105-*m* (e.g., the CU) may transmit, to access node 105-*o* (e.g., among other access nodes 105), control signaling indicating one or more configuration parameters associated with triggering or completing a power state change procedure (e.g., a transition from a first power state to a second power state). As described with reference to FIG. 3, the control signaling may indicate one or more triggering conditions (e.g., one or more thresholds), and may indicate one or more other parameters associated with a power state change (e.g., an MT or DU status when turned off). The control signaling may be or include an F1-AP message or an RRC message.

At 415, in some cases, the child node 405-*a* may transmit, to access node 105-*o*, a first measurement report (e.g., indicating one or more of a signal strength, RSRP, RSRQ, SINR) of access node 105-*n*, of a different access node 105, or both. In some cases, access node 105-*o* may transmit, to access node 105-*m*, a second measurement report of access node 105-*n*, a different access node 105, or both. The second measurement report may be based on measurements made by access node 105-*o*, by child node 405-*a* (e.g., indicated in the first measurement report), or both.

At 420, in some cases, access node 105-*m* or 105-*o*, or both, may detect that access node 105-*n* is within a defined proximity of access node 105-*o*, as described with reference to FIGS. 2 and 3. For example, if a triggering condition is met (e.g., one or more thresholds are exceeded) by one or more measurements in the second measurement report, or in other measurements made by access node 105-*o*, access node 105-*m* or 105-*o* may determine that access node 105-*n* is within the defined proximity. Alternatively, access node 105-*m* or 105-*o*, or both, may be unable to detect other access nodes 105 within the defined proximity of access node 105-*o*, as described with reference to FIGS. 2 and 3. For example, if all of the measurements of the second measurement report or the other measurements by access node 105-*o* do not meet a triggering condition (e.g., fall at or below a threshold), access node 105-*m* or 105-*o* may determine that no other access nodes 105 are within the defined proximity.

Block 425 illustrates procedures that may be taken if two mobile access nodes 105 (e.g., access nodes 105-*n* and 105-*o*) are detected within the defined proximity of each other. For example, access node 105-*n* may represent a stationary access node or another mobile access node 105. Access node 105-*m*, 105-*n*, and/or 105-*o* may detect that access nodes 105-*n* and 105-*o* are within the defined proximity using the methods described at 420. In some cases, based on the detection, one or both of access nodes 105-*n* and 105-*o* may transmit a status indication to access node 105-*m* at 425-*a*, indicating a number of connected child nodes, a mobility state, or a power consumption level. As described with reference to FIG. 3, access node 105-*m* may use the status indications to determine which mobile access node 105 is to turn off, if any. In some cases, access nodes 105-*n* and 105-*o* may coordinate information at 425-*b* (e.g., via one or more coordination messages) to determine which mobile access node 105 is to turn off. The one or more coordination messages may include a MAC CE or an F1-AP message. The F1-AP message may be transmitted from a respective mobile access node 105 to access node 105-*m* (e.g., the CU) and from access node 105-*m* to the other mobile access node 105.

At 430, in some cases, access node 105-*m* or 105-*o* may determine to change a power state of access node 105-*n* (e.g., turn on or off). For example, based on a determination that a triggering condition (e.g., threshold) is met, access node 105-*m* or 105-*o* may determine for access node 105-*o* to transition to a new power state. As described with reference to FIG. 3, a triggering condition may include a triggering condition for detecting a second access node 105 or may include one or more additional triggering conditions. The one or more additional triggering conditions may include a signal strength threshold, a parent node threshold, an interference level threshold, a power consumption level threshold, or a transmit power threshold. A triggering condition may be met if a corresponding measurement is above a threshold or is at or below a threshold. For example, if a measurement exceeds a threshold, it may be determined to transition to a lower power state (e.g., turn off), while if the measurement is less than or equal to a threshold, it may be determined to transition to a higher power state (e.g., turn on).

At 435, access node 105-*m* and access node 105-*o* may communicate a power state change indication indicating that access node 105-*o* is transitioning to a new power state (e.g., is turning on or off). The power state change indication may be based on the determination to change the power state (e.g., based on meeting one or more triggering conditions associated with one or more configuration parameters). For example, if access node 105-*o* determines to change its power state, access node 105-*o* may transmit the power state change indication to access node 105-*m*. Similarly, if access node 105-*m* determines to change the power state of access node 105-*o*, access node 105-*m* may transmit the power state change indication to access node 105-*o*. In some cases, the power state change indication may include one or more parameters, such as an action time or an ID of a detected access node. In some cases, the power state change indication may trigger a handover procedure for any child nodes 405 of access node 105-*o*. The power state change indication may be communicated via an F1-AP message or an RRC message. In some cases, the power state change indication may be communicated to child node 405-*a* via a MAC CE (e.g., from access node 105-*o* or from access node 105-*m* via access node 105-*o*).

At 440, in some cases, access node 105-*m* and child node 405-*a* may exchange handover information based on the power state change indication. For example, access node 105-*m* may transmit a handover indication to child node 405-*a* to initiate child node 405-*a* to perform a search for a new parent access node 105. In some cases, the power state change indication may serve as a handover indication to child node 405-*a*. Child node 405-*a* may search for a new parent access node 105 (e.g., may perform one or more signal measurements) and may transmit a handover measurement report to access node 105-*m* (e.g., via access node 105-*o*). Access node 105-*m* may use the handover measurement report to determine a new parent access node 105 for child node 405-*a*.

At 445, in some cases, access node 105-*m* may transmit, to access node 105-*o* and based on the power state change indication, a handover instruction to instruct access node 105-*o* to hand over child node 405-*a* (e.g., to access node 105-*n* or a different access node 105). In some cases, access node 105-*o* may forward or retransmit a portion of the handover instruction to child node 405-*a* to notify child node 405-*a* of the handover.

At 450, in some cases, access node 105-*o* and child node 405-*a* may establish communications between child node 405-*a* and a new parent access node 105, based on the handover instruction. For example, access node 105-*o* and child node 405-*a* may establish communications between child node 405-*a* and access node 105-*n*. Once communications are established with the new parent access node 105, an associated handover procedure may be considered complete.

At 455, access node 105-*o* may transition between a first power state and a second power state. For example, access node 105-*o* may turn off or on. In some cases, access node 105-*o* may transition to a lower power state (e.g., turn off) based on having completed the handover procedure. As described with reference to FIG. 3, turning off may include restricting some or all signals from a DU and restricting some communications from an MT of access node 105-*o*. Turning on may include lifting the restrictions on DU signaling and MT communications.

In some cases, if access node 105-*o* is turned off, child node 405-*a* may transmit and receive communications via a different parent access node 105, such as access node 105-*n*. For example, in the case of performing a handover procedure back to access node 105-*o* (e.g., in response to access node 105-*o* turning back on), child node 405-*a* may transmit a measurement report to access node 105-*n* (e.g., which may be forwarded to access node 105-*m*), may transmit and receive handover information via access node 105-*n*, may receive a power state change indication via access node 105-*n*, may receive a handover instruction from access node 105-*n*, and may establish communications with access node 105-*o*.

Figure 5:
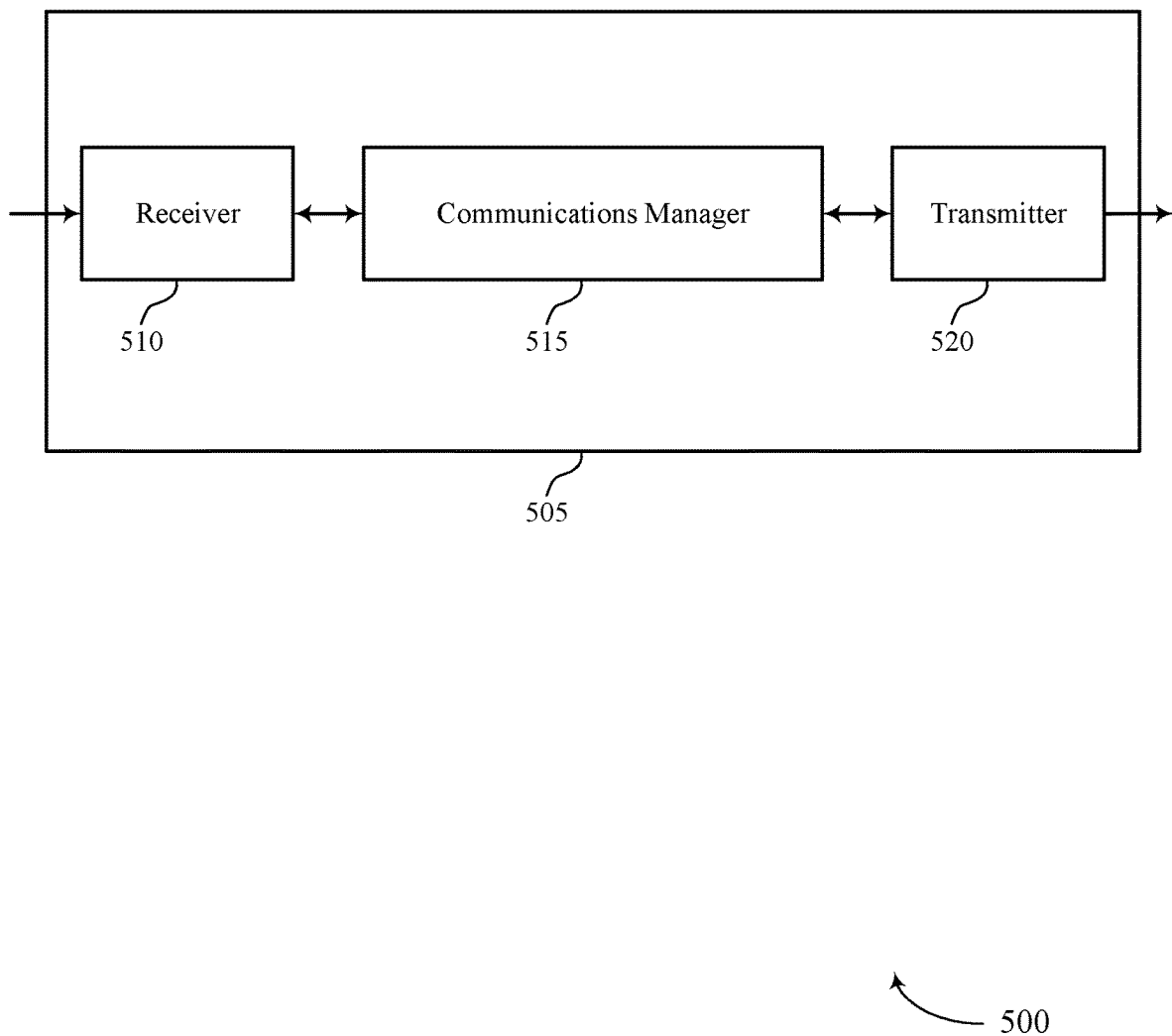
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of an access node 105 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to the techniques described herein). Information may be passed on to other components of the device 505. The receiver 510 may be an example of aspects of the transceiver 820 described with reference to FIG. 8. The receiver 510 may utilize a single antenna or a set of antennas.

The communications manager 515 may receive control signaling indicating at least one configuration parameter associated with triggering the mobile access node to transition between a first power state and a second power state that consumes less power than the first power state. The communications manager 515 may also communicate, with a CU access node of the wireless backhaul communications network, a power state change indication to indicate that the mobile access node is transitioning between the first power state and the second power state corresponding to a determination that a triggering condition associated with the at least one configuration parameter is met.

The communications manager 515 may transmit control signaling indicating at least one configuration parameter associated with triggering a mobile access node of the wireless backhaul communications network to transition between a first power state and a second power state that consumes less power than the first power state. The communications manager 515 may also communicate, with the mobile access node, a power state change indication to indicate that the mobile access node is transitioning between the first power state and the second power state corresponding to a determination that a triggering condition associated with the at least one configuration parameter is met. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The actions performed by the communications manager 515 as described herein may be implemented to realize one or more potential advantages. For example, communications manager 515 may increase communication reliability and decrease interference at a UE 115 or at an access node 105 by reducing one or more interfering transmissions (e.g., from a different access node 105), which may reduce transmission delays and reduce retransmissions. Communications manager 515 may save power and increase battery life at a UE 115 or an access node 105 by reducing transmission delays and retransmissions. Similarly, communications manager 515 may save power at an access node 105 by determining to transition the access node 105 to a lower power state.

Figure 6:
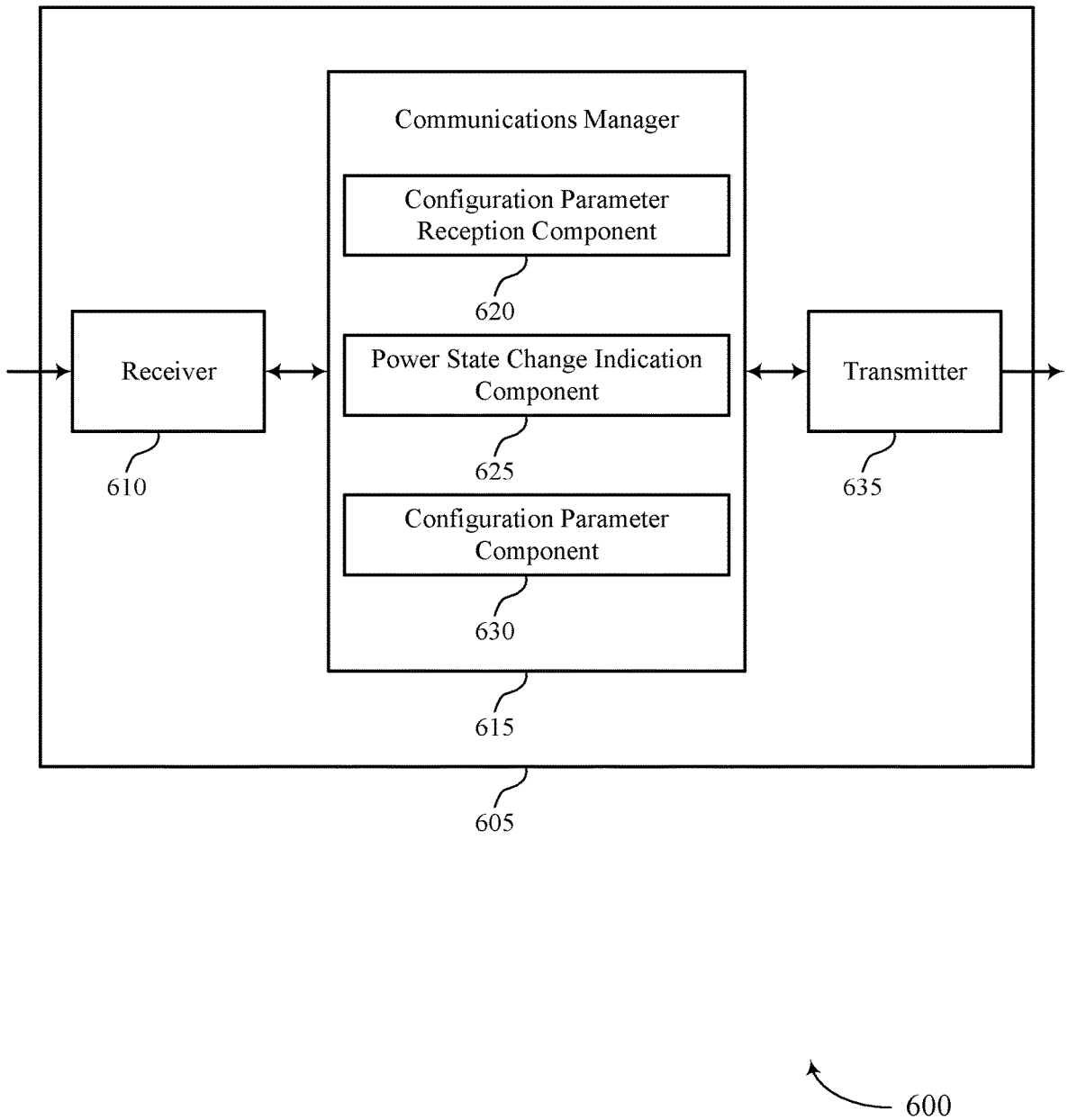

FIG. 6 shows a block diagram 600 of a device 605 in accordance with aspects of the present disclosure. The device 605 may be an example of aspects of a device 505, or an access node 105 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to the techniques described herein). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration parameter reception component 620, a power state change indication component 625, and a configuration parameter component 630. The communications manager 615 may be an example of aspects of the communications manager 810 described herein.

The configuration parameter reception component 620 may receive control signaling indicating at least one configuration parameter associated with triggering the mobile access node to transition between a first power state and a second power state that consumes less power than the first power state.

The power state change indication component 625 may communicate, with a CU access node of the wireless backhaul communications network, a power state change indication to indicate that the mobile access node is transitioning between the first power state and the second power state corresponding to a determination that a triggering condition associated with the at least one configuration parameter is met.

The configuration parameter component 630 may transmit control signaling indicating at least one configuration parameter associated with triggering a mobile access node of the wireless backhaul communications network to transition between a first power state and a second power state that consumes less power than the first power state.

The power state change indication component 625 may additionally communicate, with the mobile access node, a power state change indication to indicate that the mobile access node is transitioning between the first power state and the second power state corresponding to a determination that a triggering condition associated with the at least one configuration parameter is met.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

A processor of an access node 105 (for example, controlling the receiver 610, the transmitter 635, or the transceiver 820 as described with reference to FIG. 8) may increase communication reliability and accuracy by enabling the access node to enter a lower power state and reduce interfering transmissions (e.g., to one or more UEs 115 or other access nodes 105), which may reduce transmission delays and reduce retransmissions within a network (e.g., via implementation of system components described with reference to FIG. 7). Further, the processor of the access node 105 may identify one or more configuration parameters (e.g., triggering conditions) to perform the processes described herein. The processor of the access node 105 may identify one or more configuration parameters for the access node 105 to save power and increase battery at the access node 105 and one or more other wireless devices (e.g., by strategically reducing interfering transmissions and/or by the access node 105 entering a lower power state).

Figure 7:
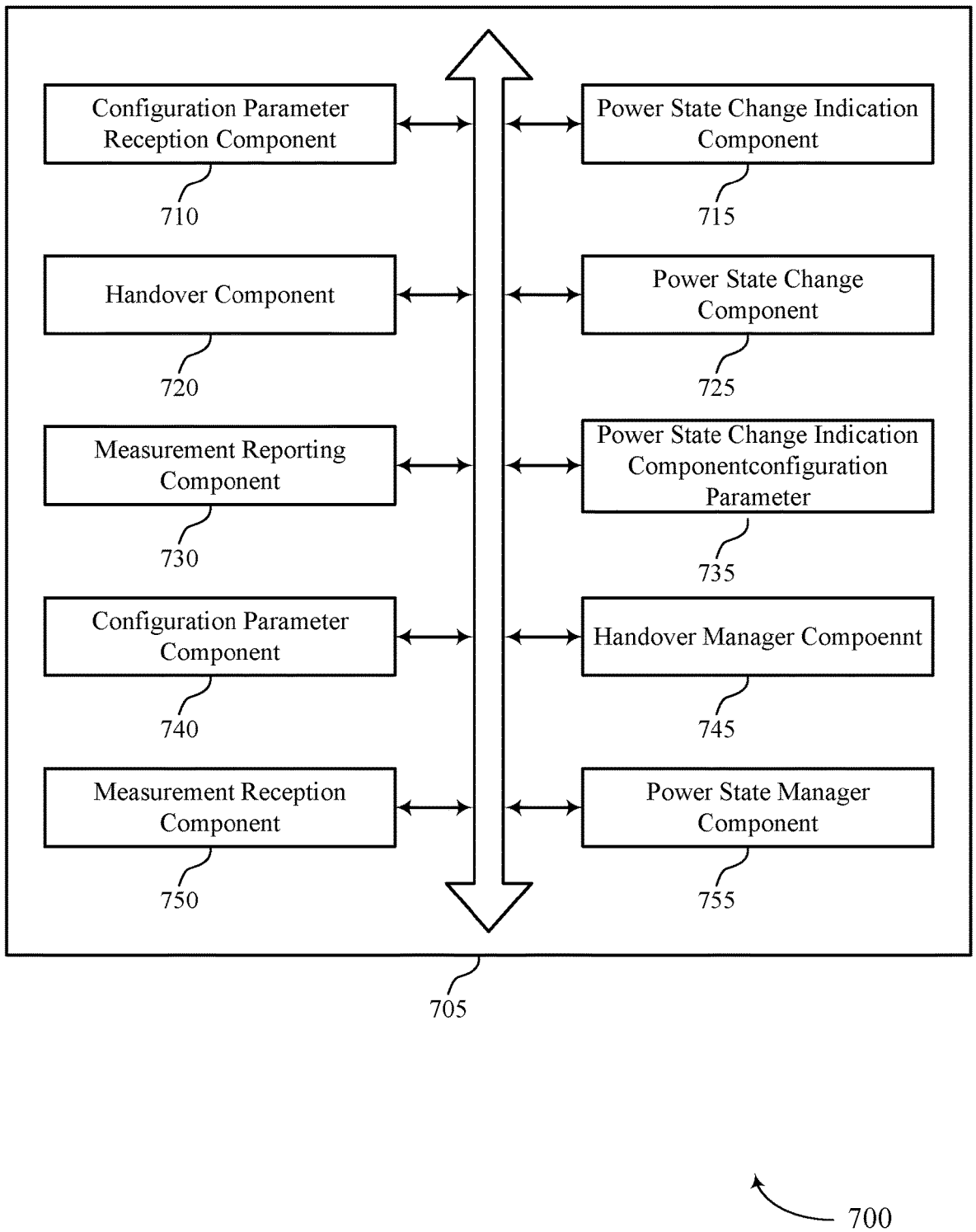
FIG. 7 shows a block diagram of a communications manager in accordance with aspects of the present disclosure.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include a configuration parameter reception component 710, a power state change indication component 715, a handover component 720, a power state change component 725, a measurement reporting component 730, a power state change indication component 735, a configuration parameter component 740, a handover manager component 745, a measurement reception component 750, and a power state manager component 755. Each of these modules may communicate, directly or indirectly, with one another (e.g., via one or more buses).

The configuration parameter reception component 710 may receive control signaling indicating at least one configuration parameter associated with triggering a mobile access node to transition between a first power state and a second power state that consumes less power than the first power state. In some examples, the configuration parameter reception component 710 may receive the control signaling that is an F1-AP message, a MAC CE, an RRC message, or any combination thereof. In some cases, the mobile access node is an IAB node and an associated wireless backhaul communications network is an IAB network.

The power state change indication component 715 may communicate, with a CU access node of the wireless backhaul communications network, a power state change indication to indicate that the mobile access node is transitioning between the first power state and the second power state corresponding to a determination that a triggering condition associated with the at least one configuration parameter is met. In some examples, the power state change indication component 715 may communicate, with the mobile access node, a power state change indication to indicate that the mobile access node is transitioning between the first power state and the second power state corresponding to a determination that a triggering condition associated with the at least one configuration parameter is met.

In some examples, the power state change indication component 715 may communicate the power state change indication to indicate that the mobile access node is transitioning from the first power state to the second power state corresponding to the determination based on the at least one configuration parameter that the mobile access node is within a defined proximity of a second access node of the wireless backhaul communications network. In some examples, the power state change indication component 715 may receive the power state change indication that indicates an ID of the second access node. In some examples, the power state change indication component 715 may transmit the power state change indication that indicates an ID of the second access node.

In some examples, the power state change indication component 715 may communicate the power state change indication to indicate that the mobile access node is transitioning from the second power state to the first power state corresponding to the determination based on the at least one configuration parameter that the mobile access node is outside of a defined proximity of a second access node of the wireless backhaul communications network. In some examples, the power state change indication component 715 may transmit the power state change indication to the CU access node based on the determination that the triggering condition is met. In some examples, the power state change indication component 715 may receive the power state change indication from the CU access node based on the determination that the triggering condition is met.

In some examples, the power state change indication component 715 may receive the control signaling that indicates that the at least one configuration parameter includes a distance threshold, where the power state change indication is communicated based on an estimated distance between the mobile access node and a second access node satisfying the distance threshold. In some examples, the power state change indication component 715 may receive the control signaling that indicates that the at least one configuration parameter includes an interference level threshold, where the power state change indication is communicated based on an interference level estimate satisfying the interference level threshold.

In some examples, the power state change indication component 715 may receive the control signaling that indicates that the at least one configuration parameter includes a power consumption level threshold, where the power state change indication is communicated based on a power consumption measurement satisfying the power consumption level threshold. In some examples, the power state change indication component 715 may receive the control signaling that indicates that the at least one configuration parameter includes a parent measurement threshold, where the power state change indication is communicated based on a measurement, by an MT of the mobile access node, of a transmission by a parent access node of the mobile access node satisfying the parent measurement threshold.

In some examples, the power state change indication component 715 may receive the control signaling that indicates that the at least one configuration parameter includes an RRM measurement threshold, where the power state change indication is communicated based on an RRM measurement by an MT of the mobile access node of a transmission by a second access node satisfying the RRM measurement threshold. In some examples, the power state change indication component 715 may receive the control signaling that indicates that the at least one configuration parameter includes an inter-relay discovery measurement threshold, where the power state change indication is communicated based on an inter-relay discovery measurement by an MT of the mobile access node satisfying the inter-relay discovery measurement threshold.

In some examples, the power state change indication component 715 may receive the control signaling that indicates that the at least one configuration parameter includes a signal strength measurement threshold, where the power state change indication is communicated based on a signal strength measurement of a second access node satisfying the signal strength measurement threshold. In some examples, the power state change indication component 715 may receive the control signaling that indicates that the at least one configuration parameter includes a signal strength measurement threshold, where the power state change indication is communicated based on a signal strength measurement of a second access node observed by a child access node satisfying the signal strength measurement threshold.

In some examples, the power state change indication component 715 may receive the power state change indication that indicates a time offset between reception of the power state change indication and when the transition between the first power state and the second power state is to occur. In some examples, the power state change indication component 715 may transmit the power state change indication that indicates a time offset between transmission of the power state change indication and when the transition between the first power state and the second power state is to occur. In some examples, the power state change indication component 715 may receive the power state change indication based on transmitting the indication of the number of child access nodes.

The power state change indication component 715 may receive the control signaling that indicates that the at least one configuration parameter includes a transmission power level threshold, where the power state change indication is communicated based on a transmission power level of the mobile access node satisfying the transmission power level threshold. In some examples, the power state change indication component 715 may receive the power state change indication based on transmitting the mobility state. In some examples, the power state change indication component 715 may receive the power state change indication based on transmitting the indication of the power consumption level. In some examples, the power state change indication component 715 may communicate the power state change indication that is an F1-AP message, a MAC CE, an RRC message, or any combination thereof.

In some examples, the power state change indication component 715 may transmit the power state change indication based on a second mobility state of the mobile access node being greater than the first mobility state. In some examples, the power state change indication component 715 may communicate the power state change indication to indicate that the mobile access node is transitioning from the first power state to the second power state corresponding to the determination based on the at least one configuration parameter that the mobile access node is within a defined proximity of a second access node of the wireless backhaul communications network. In some examples, the power state change indication component 715 may receive the power state change indication that indicates an ID of the second access node. In some examples, the power state change indication component 715 may transmit the power state change indication that indicates an ID of the second access node.

In some examples, the power state change indication component 715 may communicate the power state change indication to indicate that the mobile access node is transitioning from the second power state to the first power state corresponding to the determination based on the at least one configuration parameter that the mobile access node is outside of a defined proximity of a second access node of the wireless backhaul communications network. In some examples, the power state change indication component 715 may transmit the power state change indication to the mobile access node based on the determination that the triggering condition is met. In some examples, the power state change indication component 715 may receive the power state change indication from the mobile access node based on the determination that the triggering condition is met.

In some examples, the power state change indication component 715 may transmit the control signaling that indicates that the at least one configuration parameter includes a distance threshold, where the power state change indication is communicated based on an estimated distance between the mobile access node and a second access node satisfying the distance threshold. In some examples, the power state change indication component 715 may transmit the control signaling that indicates that the at least one configuration parameter includes an interference level threshold, where the power state change indication is communicated based on an interference level estimate satisfying the interference level threshold. In some examples, the power state change indication component 715 may transmit the control signaling that indicates that the at least one configuration parameter includes a power consumption level threshold, where the power state change indication is communicated based on a power consumption measurement satisfying the power consumption level threshold.

In some examples, the power state change indication component 715 may transmit the control signaling that indicates that the at least one configuration parameter includes a transmission power level threshold, where the power state change indication is communicated based on a transmission power level of the mobile access node satisfying the transmission power level threshold. In some examples, the power state change indication component 715 may transmit the control signaling that indicates that the at least one configuration parameter includes a parent measurement threshold, where the power state change indication is communicated based on a measurement of a transmission by a parent access node of the mobile access node satisfying the parent measurement threshold.

In some examples, the power state change indication component 715 may transmit the control signaling that indicates that the at least one configuration parameter includes an RRM measurement threshold, where the power state change indication is communicated based on an RRM measurement by an MT of the mobile access node of a transmission by a second access node satisfying the RRM measurement threshold. In some examples, the power state change indication component 715 may transmit the control signaling that indicates that the at least one configuration parameter includes an inter-relay discovery measurement threshold, where the power state change indication is communicated based on an inter-relay discovery measurement by an MT of the mobile access node satisfying the inter-relay discovery measurement threshold.

In some examples, the power state change indication component 715 may transmit the control signaling that indicates that the at least one configuration parameter includes a signal strength measurement threshold, where the power state change indication is communicated based on a signal strength measurement of a second access node satisfying the signal strength measurement threshold. In some examples, the power state change indication component 715 may transmit the control signaling that indicates that the at least one configuration parameter includes a signal strength measurement threshold, where the power state change indication is communicated based on a signal strength measurement of a second access node observed by a child access node satisfying the signal strength measurement threshold.

In some examples, the power state change indication component 715 may transmit the power state change indication that indicates a time offset between reception of the power state change indication and when the transition between the first power state and the second power state is to occur. In some examples, the power state change indication component 715 may receive the power state change indication that indicates a time offset between reception of the power state change indication and when the transition between the first power state and the second power state is to occur. In some examples, the power state change indication component 715 may transmit the power state change indication to the mobile access node based on randomly selecting between the mobile access node and a second access node to determine which of the mobile access node and the second access node is to transition to the second power state.

In some examples, the power state change indication component 715 may transmit the power state change indication to the mobile access node based on the second number of child access nodes being less than the first number of child access nodes. In some examples, the power state change indication component 715 may transmit the power state change indication based on the second power consumption level being less than the first power consumption level. In some examples, the power state change indication component 715 may communicate the power state change indication that is an F1-AP message, a MAC CE, an RRC message, or any combination thereof.

In some cases, the signal strength measurement is an RSRP measurement, an RSRQ measurement, an SINR, or any combination thereof. In some cases, the interference level estimate is generated based on a measured signal strength of an interference signal or a quality metric of data communication with one or more child nodes of the mobile access node, or both. In some cases, the quality metric is an SINR, a CQI, a BLER, or any combination thereof. In some cases, the signal strength measurement is an RSRP measurement, an RSRQ measurement, an SINR, or any combination thereof. In some cases, the signal strength measurement of the second access node is observed by the child access node.

The handover component 720 may perform a handover procedure to handover one or more child nodes of the mobile access node to the second access node or a different access node of the wireless backhaul communications network based on communicating the power state change indication. In some examples, the handover component 720 may transmit a handover indication to a child access node to initiate the child access node to perform a search for a new parent access node.

The power state change component 725 may transition to the second power state based on completion of the handover procedure. In some examples, the power state change component 725 may receive the control signaling that indicates the at least one configuration parameter that indicates to halt wireless communication by a DU of the mobile access node when in the second power state. In some examples, the power state change component 725 may receive the control signaling that indicates the at least one configuration parameter that indicates to halt wireless data communication by a DU of the mobile access node and continue to transmit SSBs by the DU when in the second power state.

In some examples, the power state change component 725 may transmit the SSBs including a cell barring flag indicating that the wireless data communication is not available from the DU when in the second power state. In some examples, the power state change component 725 may transmit the SSBs within a window for performing an inter-relay discover procedure when in the second power state. In some examples, the power state change component 725 may receive the control signaling that indicates the at least one configuration parameter that indicates to halt wireless data communication by an MT of the mobile access node and continue to monitor SSBs by the MT when in the second power state.

In some examples, the power state change component 725 may monitor the SSBs that are CD-SSBs when in the second power state. In some examples, the power state change component 725 may monitor the SSBs within a window for performing an inter-relay discover procedure when in the second power state. In some examples, the power state change component 725 may receive the control signaling that indicates the at least one configuration parameter that indicates to halt wireless data communication by an MT of the mobile access node and continue to communicate one or more control signaling messages with a parent access node of the mobile access node when in the second power state. In some examples, the power state change component 725 may transition between the first power state and the second power state based on the time offset.

The measurement reporting component 730 may transmit a measurement report indicating a measurement of the second access node, a different access node, or both, where the power state change indication is communicated from the CU access node to the mobile access node based on the measurement report. In some examples, the measurement reporting component 730 may receive, from a child access node of the mobile access node, an indication of the measurement of the second access node, the different access node, or both.

In some examples, the measurement reporting component 730 may generate the interference level estimate based on a measured signal strength of an interference signal or a quality metric of data communication with one or more child nodes of the mobile access node, or both. In some examples, the measurement reporting component 730 may receive, from the child access node, an indication of the signal strength measurement of the second access node observed by the child access node.

In some examples, the measurement reporting component 730 may transmit an indication of a number of child access nodes that are connected to the mobile access node. In some examples, the measurement reporting component 730 may transmit an indication of a mobility state of the mobile access node. In some examples, the measurement reporting component 730 may transmit an indication of a power consumption level of the mobile access node. In some examples, the measurement reporting component 730 may receive a first indication of a first mobility state of a second access node. In some cases, the measurement is a signal strength measurement, an RSRP measurement, an RSRQ measurement, an SINR, or any combination thereof. In some cases, the quality metric is an SINR, a CQI, a BLER, or any combination thereof.

The configuration parameter component 740 may transmit control signaling indicating at least one configuration parameter associated with triggering a mobile access node of the wireless backhaul communications network to transition between a first power state and a second power state that consumes less power than the first power state. In some examples, the configuration parameter component 740 may transmit the control signaling that is an F1-AP message, a MAC CE, an RRC message, or any combination thereof. In some cases, the CU node is a CU IAB node, the mobile access node is a mobile IAB node, and the wireless backhaul communications network is an IAB network.

The handover manager component 745 may transmit, to the mobile access node, a handover instruction to instruct the mobile access node to handover one or more child access nodes of the mobile access node to the second access node or a different access node of the wireless backhaul communications network based on communicating the power state change indication. In some examples, the handover manager component 745 may transmit a handover instruction that instructs the mobile access node to transmit a handover indication to a child access node to initiate the child access node to perform a search for a new parent access node.

The measurement reception component 750 may receive a measurement report indicating a measurement of the second access node, a different access node, or both, where the power state change indication is communicated from a CU access node to the mobile access node based on the measurement report. In some examples, the measurement reception component 750 may receive a first indication of a first number of child access nodes that are connected to the mobile access node and a second indication of a second number of child access nodes that are connected to a second access node. In some examples, the measurement reception component 750 may receive a first indication of a first power consumption level of the mobile access node and a second indication of a second power consumption level of a second access node. In some cases, the measurement is a signal strength measurement, an RSRP measurement, an RSRQ measurement, an SINR, or any combination thereof. In some cases, the measurement report indicates that the measurement of the second access node, the different access node, or both, is by a child access node.

The power state manager component 755 may transmit the control signaling that indicates the at least one configuration parameter that indicates to halt wireless communication by a DU of the mobile access node when in the second power state. In some examples, the power state manager component 755 may transmit the control signaling that indicates the at least one configuration parameter that indicates to halt wireless data communication by a DU of the mobile access node and continue to transmit SSBs by the DU when in the second power state. In some examples, the power state manager component 755 may transmit the control signaling that indicates the at least one configuration parameter that indicates to continue to transmit the SSBs that include a cell barring flag indicating that the wireless data communication is not available from the DU when in the second power state.

In some examples, the power state manager component 755 may transmit the control signaling that indicates the at least one configuration parameter that indicates to continue to transmit the SSBs within a window for performing an inter-relay discover procedure when in the second power state. In some examples, the power state manager component 755 may transmit the control signaling that indicates the at least one configuration parameter that indicates to halt wireless data communication by an MT of the mobile access node and continue to monitor SSBs by the MT when in the second power state.

In some examples, the power state manager component 755 may transmit the control signaling that indicates the at least one configuration parameter that indicates to continue to monitor the SSBs that are CD-SSBs when in the second power state. In some examples, the power state manager component 755 may transmit the control signaling that indicates the at least one configuration parameter that indicates to continue to monitor the SSBs within a window for performing an inter-relay discover procedure when in the second power state. In some examples, the power state manager component 755 may transmit the control signaling that indicates the at least one configuration parameter that indicates to halt wireless data communication by an MT of the mobile access node and continue to communicate one or more control signaling messages with a parent access node of the mobile access node when in the second power state.

Figure 8:
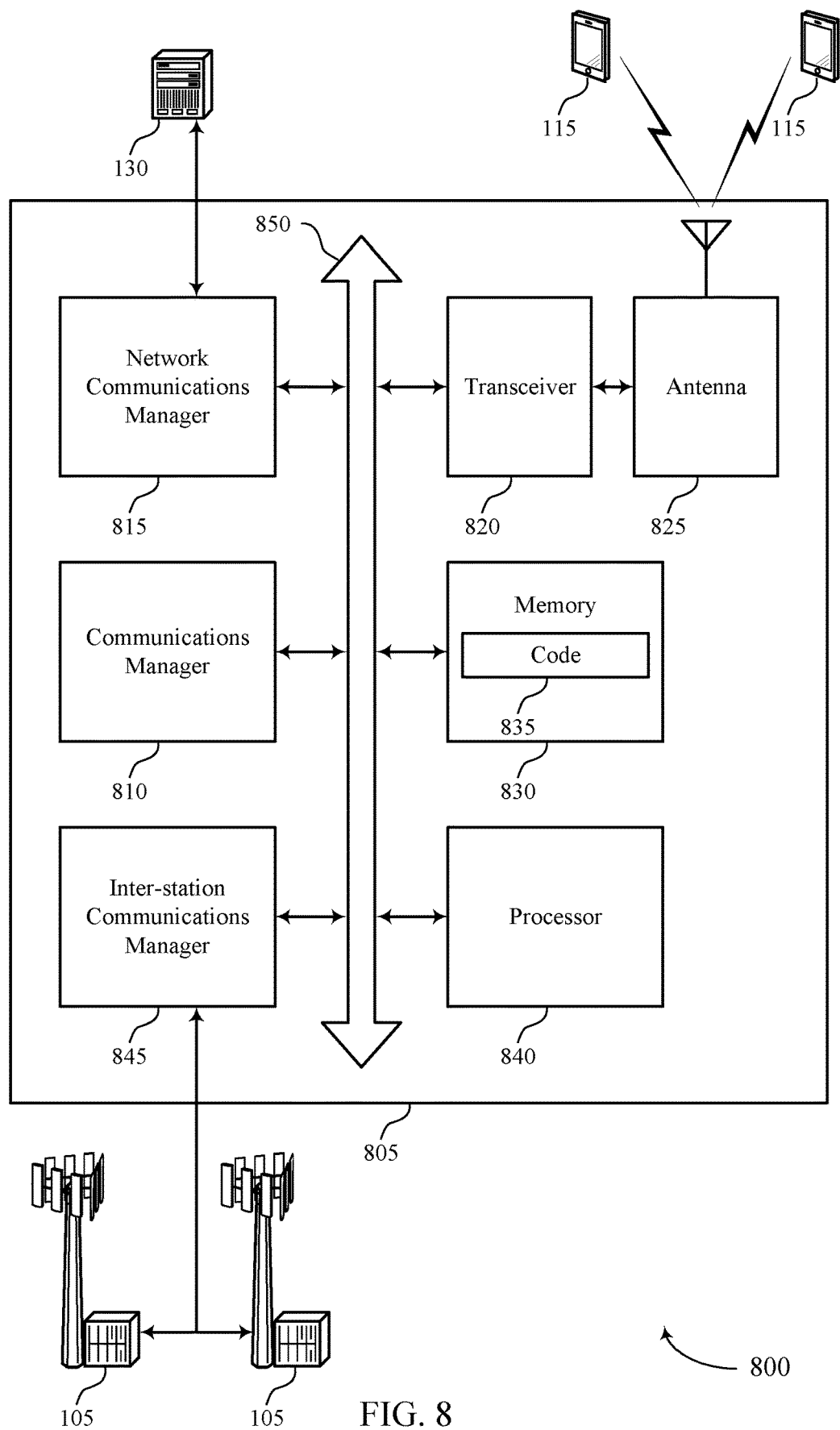
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or an access node 105 as described herein. The device 805 may include components for bi-directional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (e.g., bus 850).

The communications manager 810 may receive control signaling indicating at least one configuration parameter associated with triggering the mobile access node to transition between a first power state and a second power state that consumes less power than the first power state. The communications manager 810 may also communicate, with a CU access node of the wireless backhaul communications network, a power state change indication to indicate that the mobile access node is transitioning between the first power state and the second power state corresponding to a determination that a triggering condition associated with the at least one configuration parameter is met.

The communications manager 810 may transmit control signaling indicating at least one configuration parameter associated with triggering a mobile access node of the wireless backhaul communications network to transition between a first power state and a second power state that consumes less power than the first power state. The communications manager 810 may also communicate, with the mobile access node, a power state change indication to indicate that the mobile access node is transitioning between the first power state and the second power state corresponding to a determination that a triggering condition associated with the at least one configuration parameter is met.

The network communications manager 815 may manage communications with the core network (e.g., via one or more wired backhaul links). For example, the network communications manager 815 may manage the transfer of data communications for client devices, such as one or more UEs 115.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM), read only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some cases, a memory controller may be integrated into processor 840. The processor 840 may be configured to execute computer-readable instructions stored in a memory (e.g., the memory 830) to cause the device 805 to perform various functions (e.g., functions or tasks supporting the techniques described herein).

The inter-station communications manager 845 may manage communications with other access node 105, and may include a controller or scheduler for controlling communications with UEs 115 in cooperation with other access nodes 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communication network technology to provide communication between access nodes 105.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
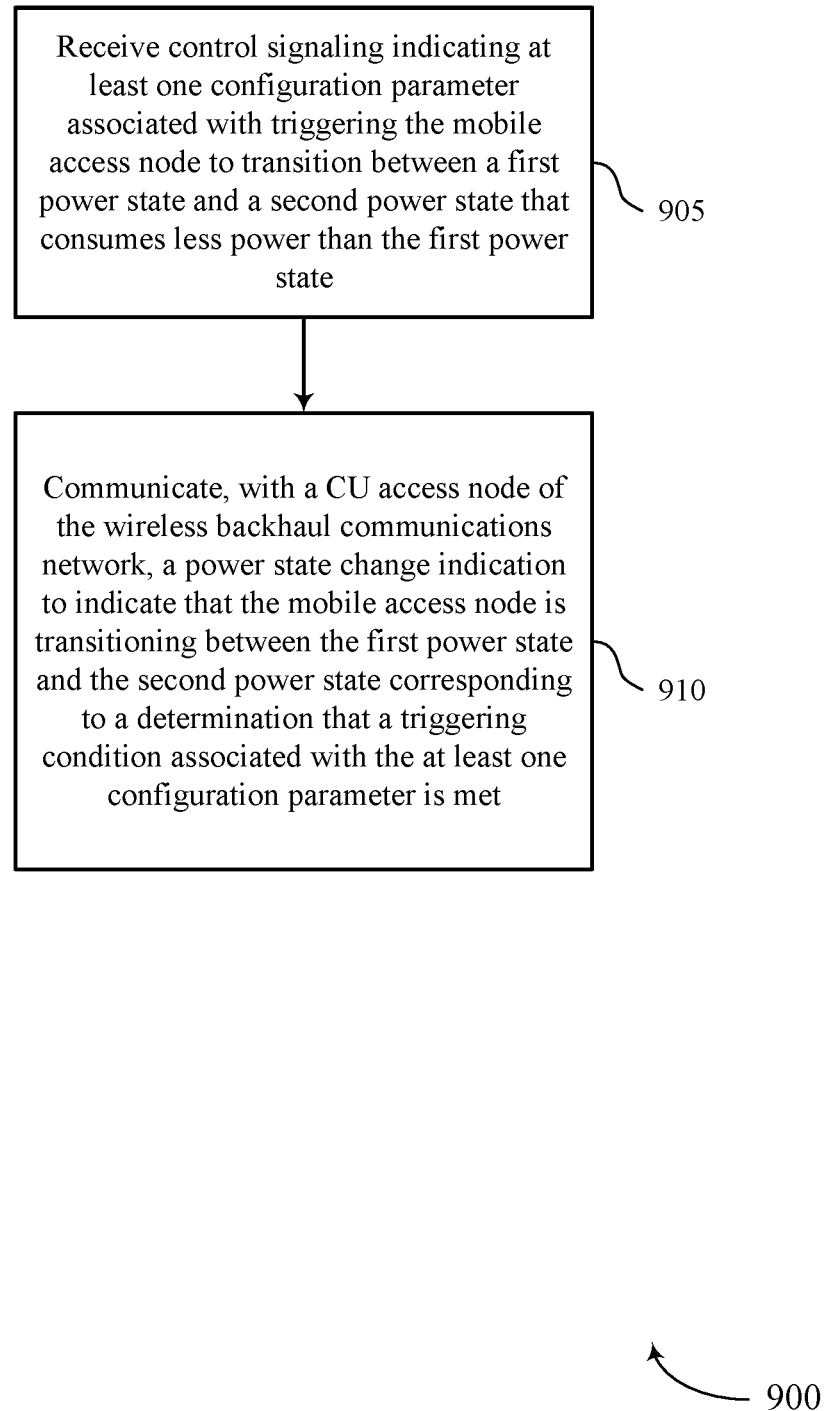
FIGS. 9 through 12 show flowcharts illustrating methods in accordance with aspects of the present disclosure.

FIG. 9 shows a flowchart illustrating a method 900 in accordance with aspects of the present disclosure. The operations of method 900 may be implemented by an access node 105 or its components as described herein. For example, the operations of method 900 may be performed by a communications manager as described with reference to FIGS. 5 through 8. In some examples, an access node may execute a set of instructions to control the functional elements of the access node to perform the functions described below. Additionally or alternatively, an access node may perform aspects of the functions described below using special-purpose hardware.

At 905, the access node may receive control signaling indicating at least one configuration parameter associated with triggering the mobile access node to transition between a first power state and a second power state that consumes less power than the first power state. The operations of 905 may be performed according to the methods described herein. In some examples, aspects of the operations of 905 may be performed by a configuration parameter reception component as described with reference to FIGS. 5 through 8.

At 910, the access node may communicate, with a CU access node of the wireless backhaul communications network, a power state change indication to indicate that the mobile access node is transitioning between the first power state and the second power state corresponding to a determination that a triggering condition associated with the at least one configuration parameter is met. The operations of 910 may be performed according to the methods described herein. In some examples, aspects of the operations of 910 may be performed by a power state change indication component as described with reference to FIGS. 5 through 8.

Figure 10:
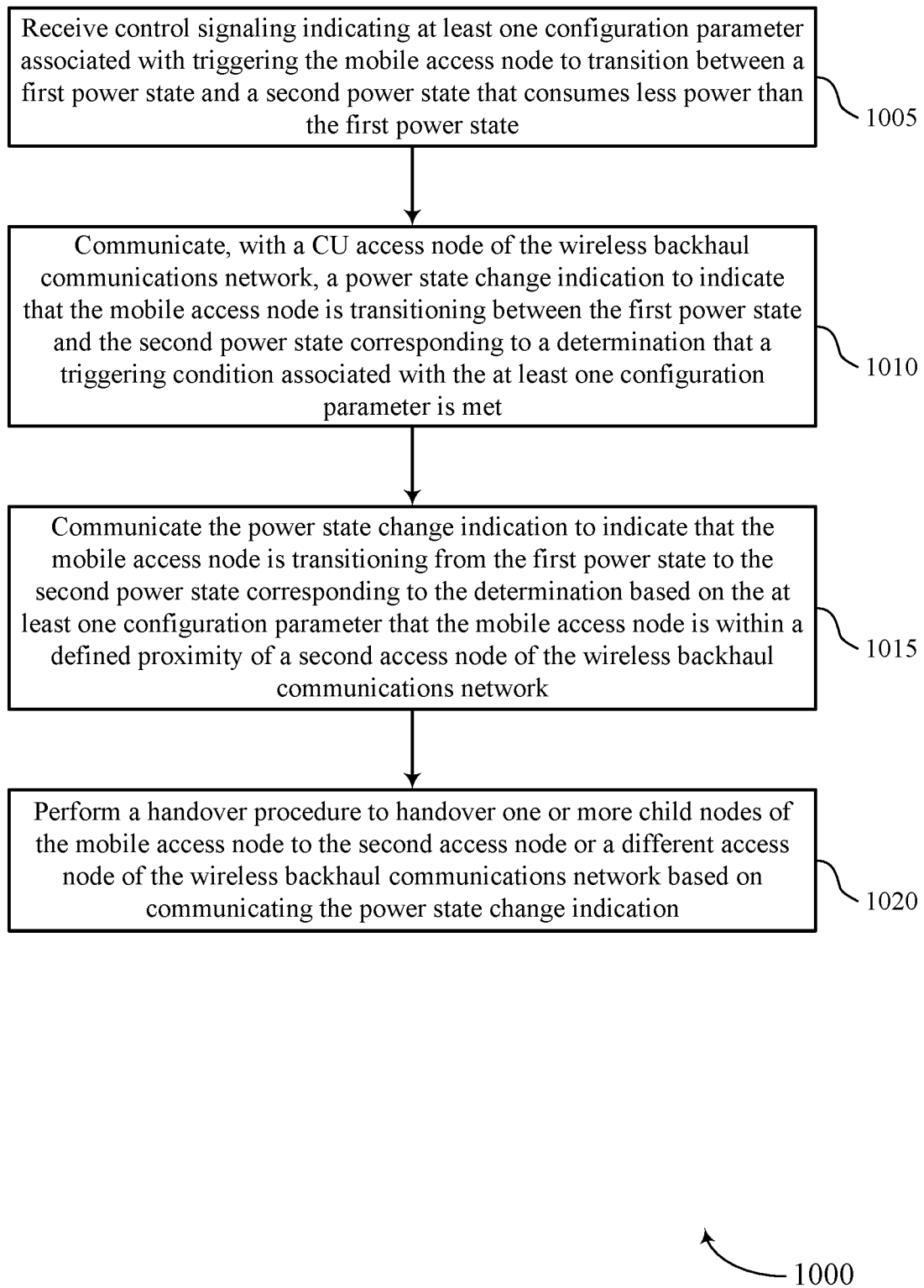

FIG. 10 shows a flowchart illustrating a method 1000 in accordance with aspects of the present disclosure. The operations of method 1000 may be implemented by an access node 105 or its components as described herein. For example, the operations of method 1000 may be performed by a communications manager as described with reference to FIGS. 5 through 8. In some examples, an access node may execute a set of instructions to control the functional elements of the access node to perform the functions described below. Additionally or alternatively, an access node may perform aspects of the functions described below using special-purpose hardware.

At 1005, the access node may receive control signaling indicating at least one configuration parameter associated with triggering the mobile access node to transition between a first power state and a second power state that consumes less power than the first power state. The operations of 1005 may be performed according to the methods described herein. In some examples, aspects of the operations of 1005 may be performed by a configuration parameter reception component as described with reference to FIGS. 5 through 8.

At 1010, the access node may communicate, with a CU access node of the wireless backhaul communications network, a power state change indication to indicate that the mobile access node is transitioning between the first power state and the second power state corresponding to a determination that a triggering condition associated with the at least one configuration parameter is met. The operations of 1010 may be performed according to the methods described herein. In some examples, aspects of the operations of 1010 may be performed by a power state change indication component as described with reference to FIGS. 5 through 8.

At 1015, the access node may communicate the power state change indication to indicate that the mobile access node is transitioning from the first power state to the second power state corresponding to the determination based on the at least one configuration parameter that the mobile access node is within a defined proximity of a second access node of the wireless backhaul communications network. The operations of 1015 may be performed according to the methods described herein. In some examples, aspects of the operations of 1015 may be performed by a power state change indication component as described with reference to FIGS. 5 through 8.

At 1020, the access node may perform a handover procedure to handover one or more child nodes of the mobile access node to the second access node or a different access node of the wireless backhaul communications network based on communicating the power state change indication. The operations of 1020 may be performed according to the methods described herein. In some examples, aspects of the operations of 1020 may be performed by a handover component as described with reference to FIGS. 5 through 8.

Figure 11:
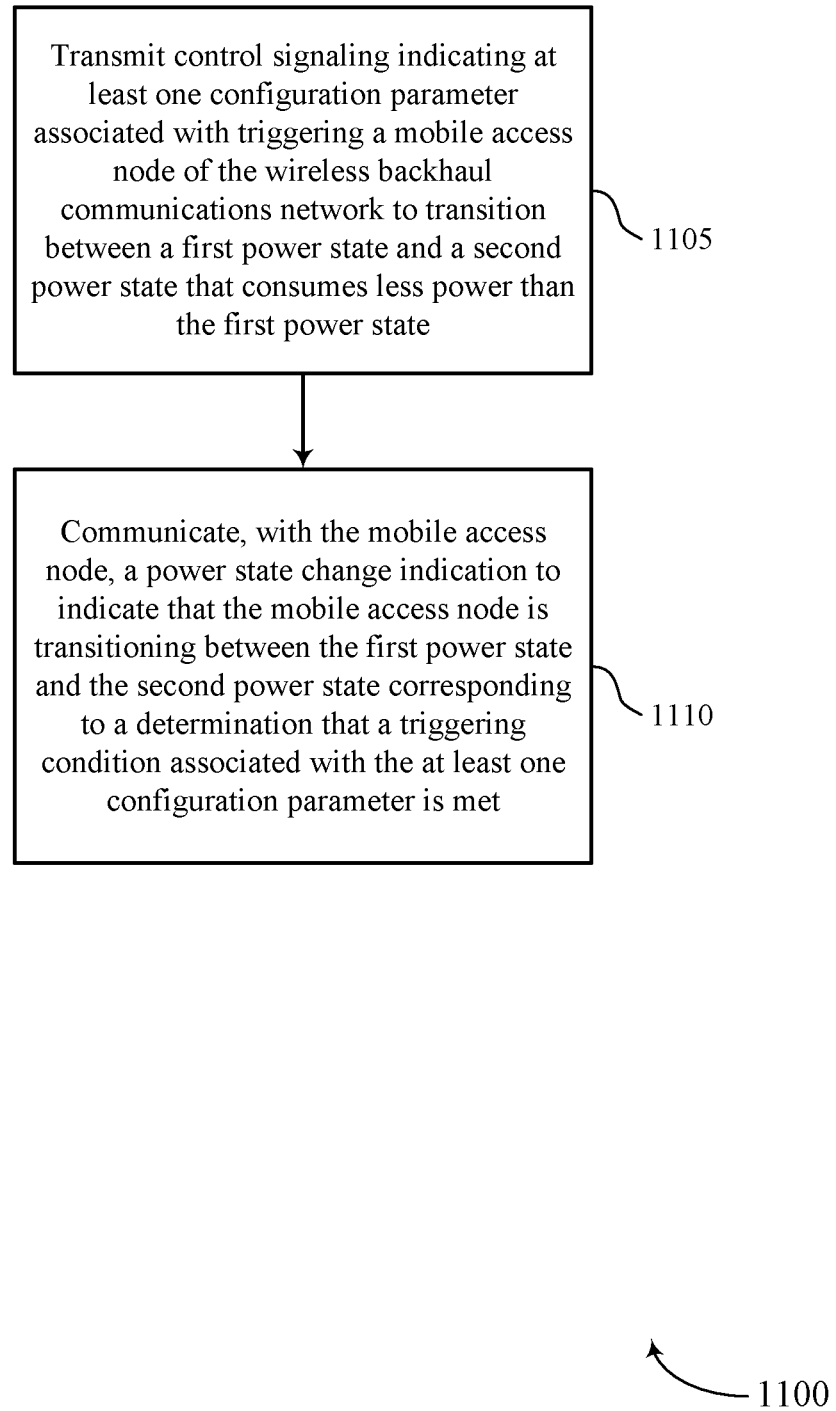

FIG. 11 shows a flowchart illustrating a method 1100 in accordance with aspects of the present disclosure. The operations of method 1100 may be implemented by an access node 105 or its components as described herein. For example, the operations of method 1100 may be performed by a communications manager as described with reference to FIGS. 5 through 8. In some examples, an access node may execute a set of instructions to control the functional elements of the access node to perform the functions described below. Additionally or alternatively, an access node may perform aspects of the functions described below using special-purpose hardware.

At 1105, the access node may transmit control signaling indicating at least one configuration parameter associated with triggering a mobile access node of the wireless backhaul communications network to transition between a first power state and a second power state that consumes less power than the first power state. The operations of 1105 may be performed according to the methods described herein. In some examples, aspects of the operations of 1105 may be performed by a configuration parameter component as described with reference to FIGS. 5 through 8.

At 1110, the access node may communicate, with the mobile access node, a power state change indication to indicate that the mobile access node is transitioning between the first power state and the second power state corresponding to a determination that a triggering condition associated with the at least one configuration parameter is met. The operations of 1110 may be performed according to the methods described herein. In some examples, aspects of the operations of 1110 may be performed by a power state change indication component as described with reference to FIGS. 5 through 8.

Figure 12:
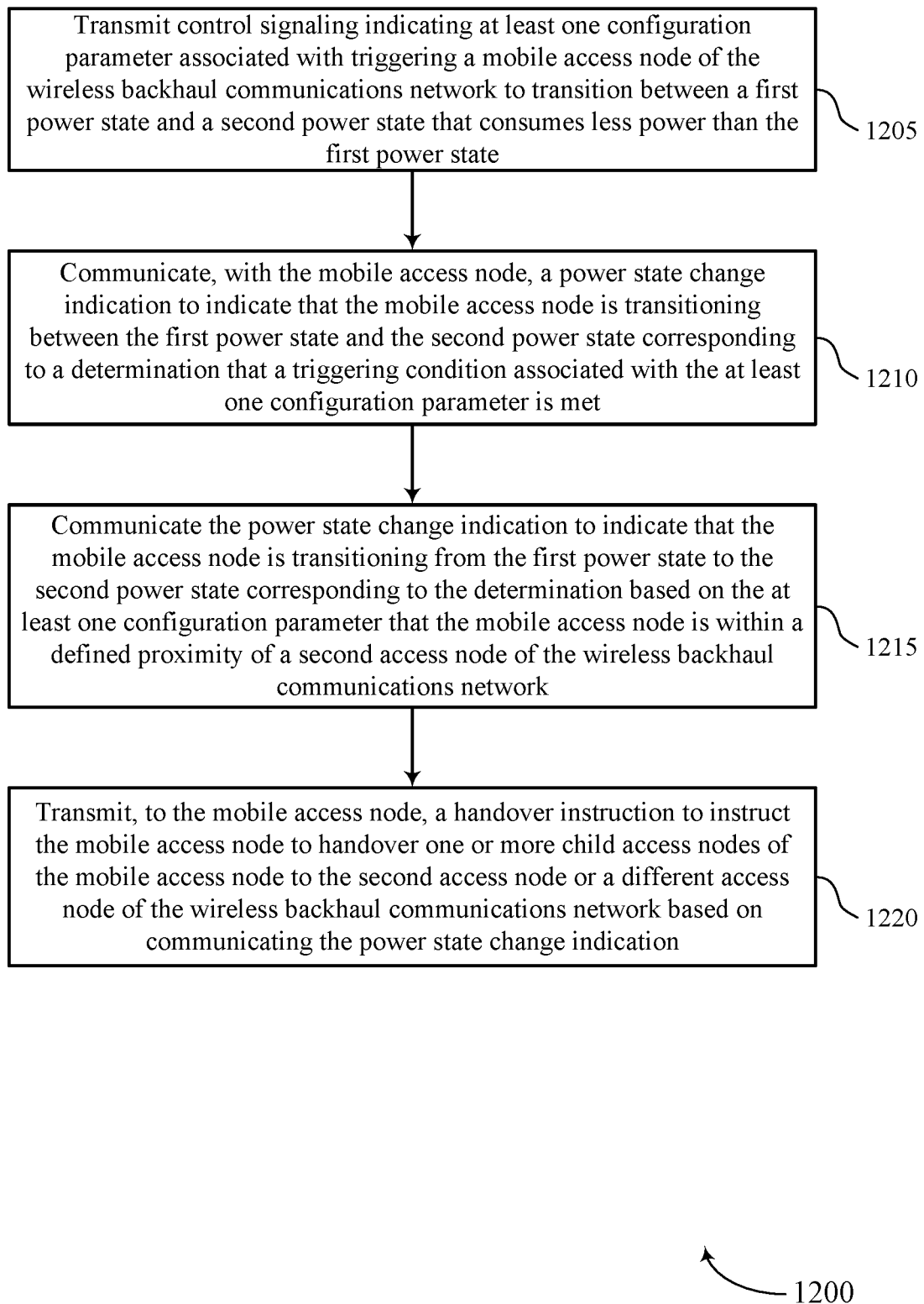

FIG. 12 shows a flowchart illustrating a method 1200 in accordance with aspects of the present disclosure. The operations of method 1200 may be implemented by an access node 105 or its components as described herein. For example, the operations of method 1200 may be performed by a communications manager as described with reference to FIGS. 5 through 8. In some examples, an access node may execute a set of instructions to control the functional elements of the access node to perform the functions described below. Additionally or alternatively, an access node may perform aspects of the functions described below using special-purpose hardware.

At 1205, the access node may transmit control signaling indicating at least one configuration parameter associated with triggering a mobile access node of the wireless backhaul communications network to transition between a first power state and a second power state that consumes less power than the first power state. The operations of 1205 may be performed according to the methods described herein. In some examples, aspects of the operations of 1205 may be performed by a configuration parameter component as described with reference to FIGS. 5 through 8.

At 1210, the access node may communicate, with the mobile access node, a power state change indication to indicate that the mobile access node is transitioning between the first power state and the second power state corresponding to a determination that a triggering condition associated with the at least one configuration parameter is met. The operations of 1210 may be performed according to the methods described herein. In some examples, aspects of the operations of 1210 may be performed by a power state change indication component as described with reference to FIGS. 5 through 8.

At 1215, the access node may communicate the power state change indication to indicate that the mobile access node is transitioning from the first power state to the second power state corresponding to the determination based on the at least one configuration parameter that the mobile access node is within a defined proximity of a second access node of the wireless backhaul communications network. The operations of 1215 may be performed according to the methods described herein. In some examples, aspects of the operations of 1215 may be performed by a power state change indication component as described with reference to FIGS. 5 through 8.

At 1220, the access node may transmit, to the mobile access node, a handover instruction to instruct the mobile access node to handover one or more child access nodes of the mobile access node to the second access node or a different access node of the wireless backhaul communications network based on communicating the power state change indication. The operations of 1220 may be performed according to the methods described herein. In some examples, aspects of the operations of 1220 may be performed by a handover manager component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a mobile access node of a wireless backhaul communications network, comprising:
receiving control signaling indicating at least one configuration parameter associated with triggering the mobile access node to transition between a first power state and a second power state that consumes less power than the first power state; and
communicating, with a central unit access node of the wireless backhaul communications network, a power state change indication to indicate that the mobile access node is transitioning between the first power state and the second power state corresponding to a determination that a triggering condition associated with the at least one configuration parameter is met.

2. The method of claim 1, wherein communicating the power state change indication comprises:
communicating the power state change indication to indicate that the mobile access node is transitioning from the first power state to the second power state corresponding to the determination based at least in part on the at least one configuration parameter that the mobile access node is within a defined proximity of a second access node of the wireless backhaul communications network; and
performing a handover procedure to handover one or more child nodes of the mobile access node to the second access node or a different access node of the wireless backhaul communications network based at least in part on communicating the power state change indication.

3. The method of claim 2, further comprising:
transitioning to the second power state based at least in part on completion of the handover procedure.

4. The method of claim 2, further comprising:
transmitting a measurement report indicating a measurement of the second access node, a different access node, or both, wherein the power state change indication is communicated from the central unit access node to the mobile access node based at least in part on the measurement report.

5. The method of claim 4, further comprising:
receiving, from a child access node of the mobile access node, an indication of the measurement of the second access node, the different access node, or both.

6. The method of claim 2, wherein communicating the power state change indication comprises:
receiving the power state change indication that indicates an identifier of the second access node.

7. The method of claim 2, wherein communicating the power state change indication comprises:
transmitting the power state change indication that indicates an identifier of the second access node.

8. The method of claim 2, wherein performing the handover procedure comprises:
transmitting a handover indication to a child access node to initiate the child access node to perform a search for a new parent access node.

9. The method of claim 1, wherein communicating the power state change indication comprises:
communicating the power state change indication to indicate that the mobile access node is transitioning from the second power state to the first power state corresponding to the determination based at least in part on the at least one configuration parameter that the mobile access node is outside of a defined proximity of a second access node of the wireless backhaul communications network.

10. The method of claim 1, wherein communicating the power state change indication comprises:
transmitting the power state change indication to the central unit access node based at least in part on the determination that the triggering condition is met.

11. The method of claim 1, wherein communicating the power state change indication comprises:
receiving the power state change indication from the central unit access node based at least in part on the determination that the triggering condition is met.

12. The method of claim 1, wherein receiving the control signaling comprises:
receiving the control signaling that indicates that the at least one configuration parameter comprises a transmission power level threshold, wherein the power state change indication is communicated based at least in part on a transmission power level of the mobile access node satisfying the transmission power level threshold.

13. The method of claim 1, wherein receiving the control signaling comprises:
receiving the control signaling that indicates the at least one configuration parameter that indicates to halt wireless communication by a distributed unit of the mobile access node when in the second power state.

14. The method of claim 1, wherein receiving the control signaling comprises:
receiving the control signaling that indicates the at least one configuration parameter that indicates to halt wireless data communication by a distributed unit of the mobile access node and continue to transmit synchronization signal blocks by the distributed unit when in the second power state.

15. The method of claim 1, wherein receiving the control signaling comprises:
receiving the control signaling that indicates the at least one configuration parameter that indicates to halt wireless data communication by a mobile termination of the mobile access node and continue to monitor synchronization signal blocks by the mobile termination when in the second power state.

16. The method of claim 1, wherein receiving the control signaling comprises:
receiving the control signaling that indicates the at least one configuration parameter that indicates to halt wireless data communication by a mobile termination of the mobile access node and continue to communicate one or more control signaling messages with a parent access node of the mobile access node when in the second power state.

17. The method of claim 1, wherein receiving the control signaling comprises:
receiving the control signaling that indicates that the at least one configuration parameter comprises a distance threshold, wherein the power state change indication is communicated based at least in part on an estimated distance between the mobile access node and a second access node satisfying the distance threshold.

18. The method of claim 1, wherein receiving the control signaling comprises:
receiving the control signaling that indicates that the at least one configuration parameter comprises an interference level threshold, wherein the power state change indication is communicated based at least in part on an interference level estimate satisfying the interference level threshold.

19. The method of claim 1, wherein receiving the control signaling comprises:
receiving the control signaling that indicates that the at least one configuration parameter comprises a power consumption level threshold, wherein the power state change indication is communicated based at least in part on a power consumption measurement satisfying the power consumption level threshold.

20. The method of claim 1, wherein receiving the control signaling comprises:
receiving the control signaling that indicates that the at least one configuration parameter comprises a parent measurement threshold, wherein the power state change indication is communicated based at least in part on a measurement, by a mobile termination of the mobile access node, of a transmission by a parent access node of the mobile access node satisfying the parent measurement threshold.

21. The method of claim 1, wherein receiving the control signaling comprises:
receiving the control signaling that indicates that the at least one configuration parameter comprises a radio resource management measurement threshold, wherein the power state change indication is communicated based at least in part on a radio resource management measurement by a mobile termination of the mobile access node of a transmission by a second access node satisfying the radio resource management measurement threshold.

22. The method of claim 1, wherein receiving the control signaling comprises:
receiving the control signaling that indicates that the at least one configuration parameter comprises an inter-relay discovery measurement threshold, wherein the power state change indication is communicated based at least in part on an inter-relay discovery measurement by a mobile termination of the mobile access node satisfying the inter-relay discovery measurement threshold.

23. The method of claim 1, wherein receiving the control signaling comprises:
receiving the control signaling that indicates that the at least one configuration parameter comprises a signal strength measurement threshold, wherein the power state change indication is communicated based at least in part on a signal strength measurement of a second access node satisfying the signal strength measurement threshold.

24. The method of claim 1, wherein receiving the control signaling comprises:
receiving the control signaling that indicates that the at least one configuration parameter comprises a signal strength measurement threshold, wherein the power state change indication is communicated based at least in part on a signal strength measurement of a second access node observed by a child access node satisfying the signal strength measurement threshold.

25. The method of claim 1, wherein communicating the power state change indication comprises:
receiving the power state change indication that indicates a time offset between reception of the power state change indication and when the transition between the first power state and the second power state is to occur; and
transitioning between the first power state and the second power state based at least in part on the time offset.

26. The method of claim 1, wherein communicating the power state change indication comprises:
transmitting the power state change indication that indicates a time offset between transmission of the power state change indication and when the transition between the first power state and the second power state is to occur; and
transitioning between the first power state and the second power state based at least in part on the time offset.

27. An apparatus for wireless communications by a mobile access node of a wireless backhaul communications network, comprising:
a processor;
memory coupled with the processor; and
instructions stored in the memory and executable by the processor to cause the apparatus to:
receive control signaling indicating at least one configuration parameter associated with triggering the mobile access node to transition between a first power state and a second power state that consumes less power than the first power state; and
communicate, with a central unit access node of the wireless backhaul communications network, a power state change indication to indicate that the mobile access node is transitioning between the first power state and the second power state corresponding to a determination that a triggering condition associated with the at least one configuration parameter is met.

28. The apparatus of claim 27, further comprising a transceiver, wherein the instructions to communicate the power state change indication are executable by the processor to cause the apparatus to:
communicate, via the transceiver, the power state change indication to indicate that the mobile access node is transitioning from the first power state to the second power state corresponding to the determination based at least in part on the at least one configuration parameter that the mobile access node is within a defined proximity of a second access node of the wireless backhaul communications network; and
perform a handover procedure to handover one or more child nodes of the mobile access node to the second access node or a different access node of the wireless backhaul communications network based at least in part on communicating the power state change indication.

* * * * *